US008384972B2

(12) United States Patent
Fujiwara et al.

(10) Patent No.: US 8,384,972 B2
(45) Date of Patent: Feb. 26, 2013

(54) IMAGE INPUT/OUTPUT CONTROL APPARATUS, IMAGE PROCESSING APPARATUS, IMAGE PROCESSING METHOD, DATA COMMUNICATION APPARATUS, AND DATA COMMUNICATION METHOD

(75) Inventors: Takafumi Fujiwara, Tokyo (JP); Atsushi Date, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 814 days.

(21) Appl. No.: 11/380,106

(22) Filed: Apr. 25, 2006

(65) Prior Publication Data

US 2006/0182106 A1    Aug. 17, 2006

Related U.S. Application Data

(62) Division of application No. 10/050,781, filed on Jan. 18, 2002, now Pat. No. 7,315,388.

(30) Foreign Application Priority Data

| Jan. 24, 2001 | (JP) | 2001-015833 |
| Jan. 31, 2001 | (JP) | 2001-024168 |
| Dec. 26, 2001 | (JP) | 2001-394081 |
| Dec. 26, 2001 | (JP) | 2001-394362 |

(51) Int. Cl.
*H04N 1/46* (2006.01)
*H04N 1/00* (2006.01)

(52) U.S. Cl. .................. 358/530; 358/426.04; 358/539; 358/1.15; 358/448; 347/5; 382/166; 382/232; 709/201

(58) Field of Classification Search .................. None
See application file for complete search history.

(56) References Cited

U.S. PATENT DOCUMENTS

| 5,204,916 | A | * | 4/1993 | Hamilton et al. | 382/296 |
| 5,327,248 | A | * | 7/1994 | Miller et al. | 382/233 |
| 5,398,315 | A | * | 3/1995 | Johnson et al. | 604/323 |
| 5,561,542 | A | | 10/1996 | Kosugi et al. | 359/118 |
| 5,602,663 | A | | 2/1997 | Hamaguchi et al. | 359/125 |
| 5,604,748 | A | | 2/1997 | Date et al. | 370/449 |
| 5,794,064 | A | * | 8/1998 | Yoshida et al. | 712/25 |
| 5,889,596 | A | | 3/1999 | Yaguchi et al. | 358/448 |
| 5,963,344 | A | * | 10/1999 | Morita et al. | 358/482 |
| 6,009,490 | A | | 12/1999 | Fukui et al. | 710/113 |
| 6,094,510 | A | | 7/2000 | Yaguchi et al. | 382/232 |
| 6,438,635 | B1 | | 8/2002 | Date et al. | 710/113 |
| 6,480,916 | B1 | | 11/2002 | Shishizuka et al. | 710/107 |

(Continued)

FOREIGN PATENT DOCUMENTS

| CN | 1190752 A | 8/1998 |
| JP | 4-001771 | 1/1992 |

(Continued)

*Primary Examiner* — Marivelisse Santiago Cordero
*Assistant Examiner* — Huo Long Chen
(74) *Attorney, Agent, or Firm* — Fitzpatrick, Cella, Harper & Scinto

(57) ABSTRACT

An image input/output control apparatus includes a control device for controlling input/output of image data with an external apparatus, plural image processing devices for performing predetermined image processes to the image data, and plural data transfer devices for connecting each of the plural image processing devices and the control device like a ring and performing data transfer among them. The plural image processing devices and the control device are composed respectively on different units, whereby the structure of the apparatus can be easily changed, and a decrease in processing speed due to the competition for buses can be reduced without increasing the number of parts necessary for bus control.

11 Claims, 23 Drawing Sheets

U.S. PATENT DOCUMENTS

| | | | |
|---|---|---|---|
| 6,499,076 B2 | 12/2002 | Date et al. | 710/113 |
| 6,515,760 B1 * | 2/2003 | Lourette et al. | 358/1.18 |
| 6,604,151 B1 | 8/2003 | Date et al. | 710/14 |
| 6,697,898 B1 | 2/2004 | Shishizuka et al. | 710/107 |
| 6,707,569 B1 | 3/2004 | Kato et al. | 710/107 |
| 6,708,236 B1 | 3/2004 | Date et al. | 710/35 |
| 7,002,709 B1 * | 2/2006 | Terada et al. | 358/3.28 |
| 7,286,720 B2 * | 10/2007 | Ueda | 382/298 |
| 2001/0022663 A1 * | 9/2001 | Ishikawa et al. | 358/1.9 |
| 2001/0033392 A1 * | 10/2001 | Utsunomiya | 358/1.15 |
| 2002/0007431 A1 | 1/2002 | Date et al. | 710/113 |
| 2002/0010567 A1 | 1/2002 | Kusunoki | 703/2 |
| 2002/0059491 A1 | 5/2002 | Date et al. | 710/240 |
| 2003/0151759 A1 | 8/2003 | Suzuki et al. | 358/1.13 |

FOREIGN PATENT DOCUMENTS

| | | |
|---|---|---|
| JP | 08317225 A * | 11/1996 |
| JP | 10-190634 | 7/1998 |
| JP | 11-45225 | 2/1999 |
| JP | 11239235 A * | 8/1999 |
| JP | 2001-007786 | 1/2001 |
| JP | 2001-103473 | 4/2001 |
| JP | 2001332976 A * | 11/2001 |

* cited by examiner

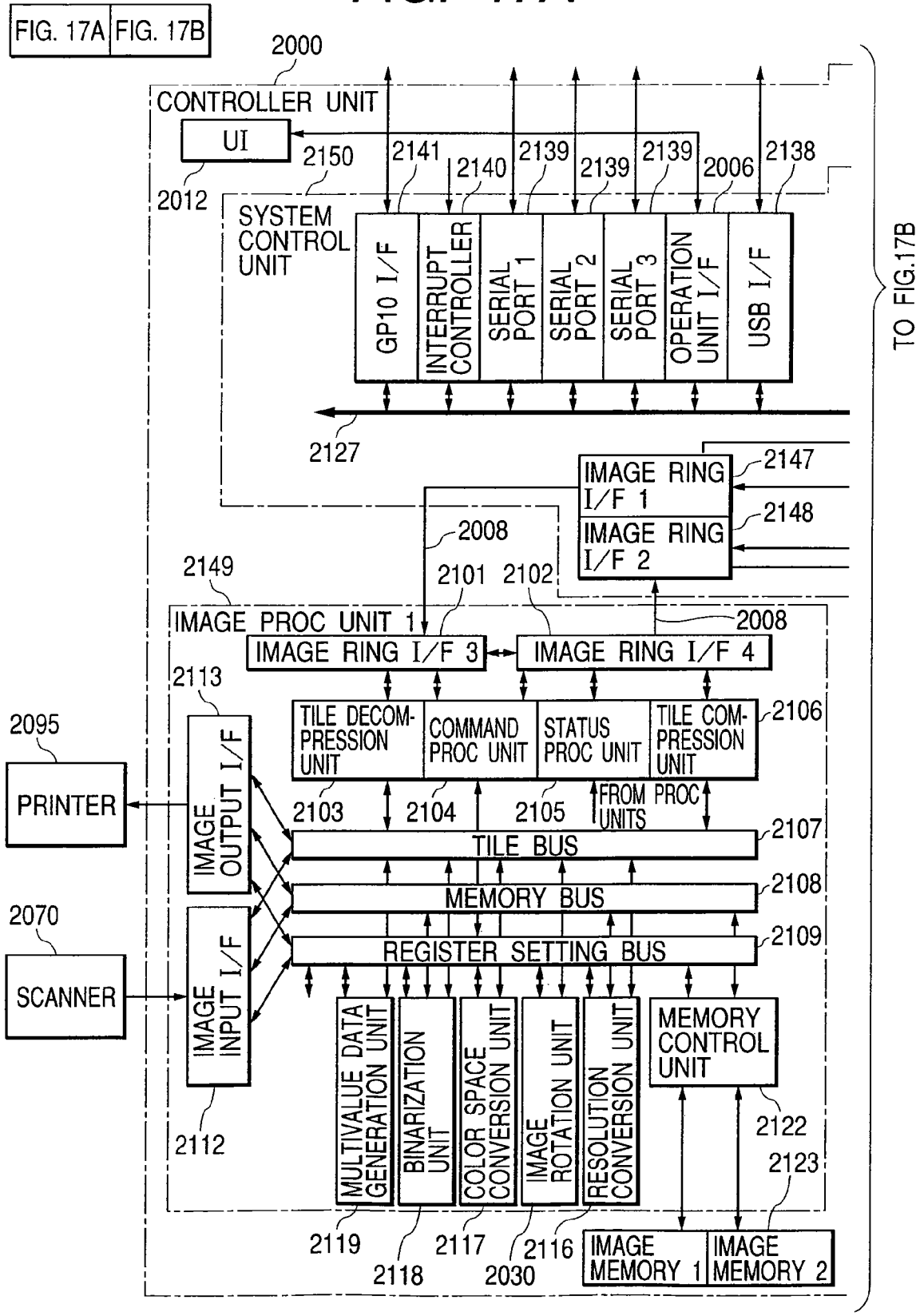

FIG. 18

TILE DATA FORMAT

PAGE
220×156 TILES
(A4 600dpi)

TILE
32×32 PIXELS

DATA ORDER

THE NUMBER OF TILES IN 1 PAGE

A4 600dpi  220 TILES × 156 TILES = 34,320 TILES
A3 1200dpi 440 TILES × 624 TILES = 274,560 TILES

IMAGE INPUT/OUTPUT CONTROL APPARATUS, IMAGE PROCESSING APPARATUS, IMAGE PROCESSING METHOD, DATA COMMUNICATION APPARATUS, AND DATA COMMUNICATION METHOD

RELATED APPLICATION

This application is a divisional of application No. 10/050,781, filed Jan. 18, 2002, and claims benefit of the filing dates of that application and of Japanese patent applications nos. 2001-015833, filed Jan. 24, 2001, 2001-024168, filed Jan. 31, 2001, 2001-394081, filed Dec. 26, 2001, and 2001-394362, filed Dec. 26, 2001. The entire contents of all five of those prior applications are incorporated herein by reference.

BACKGROUND OF THE INVENTION

1. Field of the Invention

The present invention relates to an image input/output apparatus, an image processing apparatus, an image processing method, a data communication apparatus and a data communication method which perform a predetermined image process for image data.

2. Related Background Art

A digital multifunctional machine which includes various functions such as a scanner function, a printer function, a copying machine function, a network function and the like has been known, and in such the digital multifunctional machine, functional operations are generally controlled by an image input/output control apparatus called a controller.

In recent years, according as the digital multifunctional machine becomes sophisticated, an image input/output control apparatus capable of effectively processing a large amount of data is desired, and a controller for a multifunctional apparatus structured on a single semiconductor substrate as shown in Japanese Patent Application (Laid-Open) No. 11-45225 is proposed. Besides, a controller for a multifunctional apparatus structured so that plural image processing units are connected to a single shared bus represented by a PCI (peripheral component interconnect) bus is proposed.

However, if it tries to add or change a processing function when processing capability is insufficient, since the above controller of the multifunctional apparatus includes an image processing unit, a system control unit and the like on the single semiconductor substrate, there is a problem that such a structure can not be easily changed.

Further, even if the controller includes the PCI bus, such the controller has the structure that image data is sent in the shared bus. Therefore, even if the number of processing units increases to increase the processing capability, there is a problem that system performance is limited by the single shared bus.

In such a case, it is possible to provide a high bus control function so that the system performance is not limited. However, there is a problem that the number of structural parts increases, and thus the price of the apparatus becomes expensive as a whole.

Further, for example, in a case where a scanning operation and a printing operation are simultaneously performed, even if the apparatus includes plural image processing units, there is a problem that the processes concentrate on the one image processing unit and thus the competition for the image processing unit may occur.

Further, a technique to packet image data and then process a generated packet for improving efficiency of process, reducing memories, and the like is proposed. In general, when packet image data is transmitted, information representing the data length is written on the packet header, whereby the packet is transmitted among various units after the packet length was established.

However, in such a case where the packet image data is transmitted after the data was compressed, since the packet length is not established if the data compression does not end, it is necessary to transmit the packet image data after the compression ended. That is, a buffer for storing the packet image data before it is transmitted is necessary. Here, it is generally difficult to predict the data capacity after the data was compressed, and there is a possibility that the data capacity after the data compression becomes larger than the original data capacity. If so, since it is necessary to secure the capacity of the buffer to have sufficient room, a remarkably large capacity might become necessary when the maximum capacity of the image data included in the image data packet to be processed is large.

SUMMARY OF THE INVENTION

The present invention is to solve the above-described problems, and an object thereof is to provide an image input/output control apparatus of which the structure can be easily changed and which can reduce a decrease in processing speed due to the competition for buses without increasing the number of parts necessary for bus control or the like.

As one means to achieve the above object, the present invention provides an image input/output control apparatus for performing input/output of image data with an external apparatus, comprising:

a control means for controlling the input/output of the image data with the external apparatus;

plural image processing means for performing predetermined image processes to the image data; and plural data transfer means for connecting each of the plural image processing means and the control means like a ring and performing data transfer, wherein each of the plural image processing means and the control means are composed respectively on different units.

Another object of the present invention is to provide an image processing apparatus and an image processing method in the image processing apparatus, which can easily control image processes in plural image processing units even in case of parallel processes or the like.

As one means to achieve the above object, the present invention provides an image processing apparatus comprising:

plural image processing means for performing predetermined image processes to image data;

a first generation means for generating a command packet in which a header including discrimination information to discriminate to which of the plural image processing means processing setting should be performed is added to command data including processing information to perform the processing setting for the plural image processing means;

a packet transfer means for connecting each of the plural image processing means and the first generation means and performing packet transfer, wherein the plural image processing means analyze the header of the input command packet and control the process concerning the input command packet on the basis of the discrimination information described on the header.

Still another object of the present invention is to provide an image input/output apparatus and an image processing method in the image input/output apparatus, which can perform image input and output operations using an image memory without any competition for an image processing unit and a bus.

As one means to achieve the above object, the present invention provides an image input/output control apparatus comprising:

a control means, connected to a memory for storing image data, for controlling input/output of the image data performed with an external apparatus;

a first image processing means, connected to an image output apparatus, for performing a predetermined image process to image data to be output by the image output apparatus, on the basis of processing setting information sent from the control means;

a second image processing means, connected to an image input apparatus, for performing a predetermined image process to image data input by the image input apparatus, on the basis of the processing setting information sent from the control means; and a data transfer means for establishing ring-like connection between the control means and the first image processing means, between the first image processing means and the second image processing means, and between the second image processing means and the control means, and unidirectionally transferring the setting processing information and the image data.

Still another object of the present invention is to provide an image input/output apparatus and an image processing method in the image input/output apparatus, which can perform image input and output operations and image conversion using an image memory without any competition for an image processing unit and a bus.

As one means to achieve the above object, the present invention provides an image input/output control apparatus comprising:

a control means, connected to a memory for storing image data, for controlling input/output of the image data performed with an external apparatus;

a first image processing means, connected to an image output apparatus, for performing a predetermined image process to image data to be output by the image output apparatus, on the basis of processing setting information sent from the control means;

a second image processing means, connected to an image input apparatus, for performing a predetermined image process to image data input by the image input apparatus, on the basis of the processing setting information sent from the control means;

a third image processing means for performing a predetermined conversion process to the input image data on the basis of the processing setting information sent from the control means; and a data transfer means for establishing ring-like connection between the control means and the first image processing means, between the first image processing means and the second image processing means, between the second image processing means and the third image processing means and between the third image processing means and the control means, and unidirectionally transferring the setting processing information and the image data.

Still another object of the present invention is to provide a data communication apparatus and a data communication method, which can transmit a data packet before header information is established and thus can decrease a buffer capacity used to temporarily store image data on a transmission side.

As one means to achieve the above object, the present invention provides a data communication apparatus which performs transmission/reception of a data packet composed of image data and a header including information concerning the image data, the apparatus comprising:

transmission means for transmitting the data packet; and reception means for receiving the data packet transmitted by the transmission means, wherein the transmission means transmits, after transmitting the data packet, a footer including the same information as that of the header of the transmitted data packet, and the reception means updates the information of the header on the basis of the received footer.

Still another object of the present invention is to provide a data communication apparatus and a data communication method, which can update header information stored in a memory device at a transmission destination and thus can decrease a buffer capacity used to temporarily store image data on a transmission side.

As one means to achieve the above object, the present invention provides a data communication apparatus which transmits a data packet composed of image data and a header including information concerning the image data to a predetermined memory, the apparatus comprising:

a transmission means for transmitting the data packet to the predetermined memory; and a notification means for notifying the predetermined memory whether or not the transmission means transmits a footer, wherein, in a case where the content of the header is not yet determined when the data packet is transmitted by the transmission means, the notification means notifies the memory that the image data transmission ends when the last image data is transmitted, and the transmission means transmits, after the notification by the notification means ended, the footer including information to update the information of the header stored in the predetermined memory.

Still another object of the present invention is to provide a data communication apparatus and a data communication method, in which header transmission need not be waited for until compression of a data packet ends and which can thus decrease a buffer capacity used to temporarily store image data on a transmission side.

As one means to achieve the above object, the present invention provides a data communication apparatus which can communicate with plural image processing apparatuses performing image processes of a data packet composed of image data and a header including information concerning the image data, and performs communication using the data packet among the plural image processing apparatuses, the data communication apparatus comprising:

transfer means for transferring the data packet from the image processing apparatus on a transmission side to the image processing apparatus on a reception side; and setting means for setting either a compression mode or a non-compression mode to the image processing apparatus on the transmission side, wherein, in a case where the compression mode is set to the image processing apparatus on the transmission side by the setting means, the transfer means transfers information representing transmission of a footer to the image processing apparatus on the reception side, and, after transmitting the data packet, transfers the footer including information to update the information of the header transferred to the image processing apparatus on the reception side.

Still another object of the present invention is to provide a data processing apparatus and a data communication method in the data processing apparatus, in which header transmission need not be waited for until encoding of a data packet ends, which can perform parallel processes of the encoding and storage control, and which can thus achieve efficiency improvement and speed-up of processes.

As one means to achieve the above object, the present invention provides an image processing apparatus which performs an image process of a data packet composed of image data and a header including information concerning the image data, the apparatus comprising:

encoding means for performing a predetermined encoding process to the image data;

memory control means for controlling writing of the image data in a memory; and transfer means for transferring the data packet encoded by the encoding means to the memory control means, wherein the transfer means transfers, after transferring the data packet, a footer including the same information as that of the header of the transferred data packet, and the memory control means updates the information of the header on the basis of the received footer.

The above and other objects, features and effects of the present invention will become apparent from the following detailed description and the attached drawings.

BRIEF DESCRIPTION OF THE DRAWINGS

FIG. 18 is a diagram showing tile image data in the third embodiment;

DETAILED DESCRIPTION OF THE PREFERRED EMBODIMENTS

Hereinafter, the embodiments of the present invention will be explained with reference to the attached drawings.
(First Embodiment)

Figure 1:
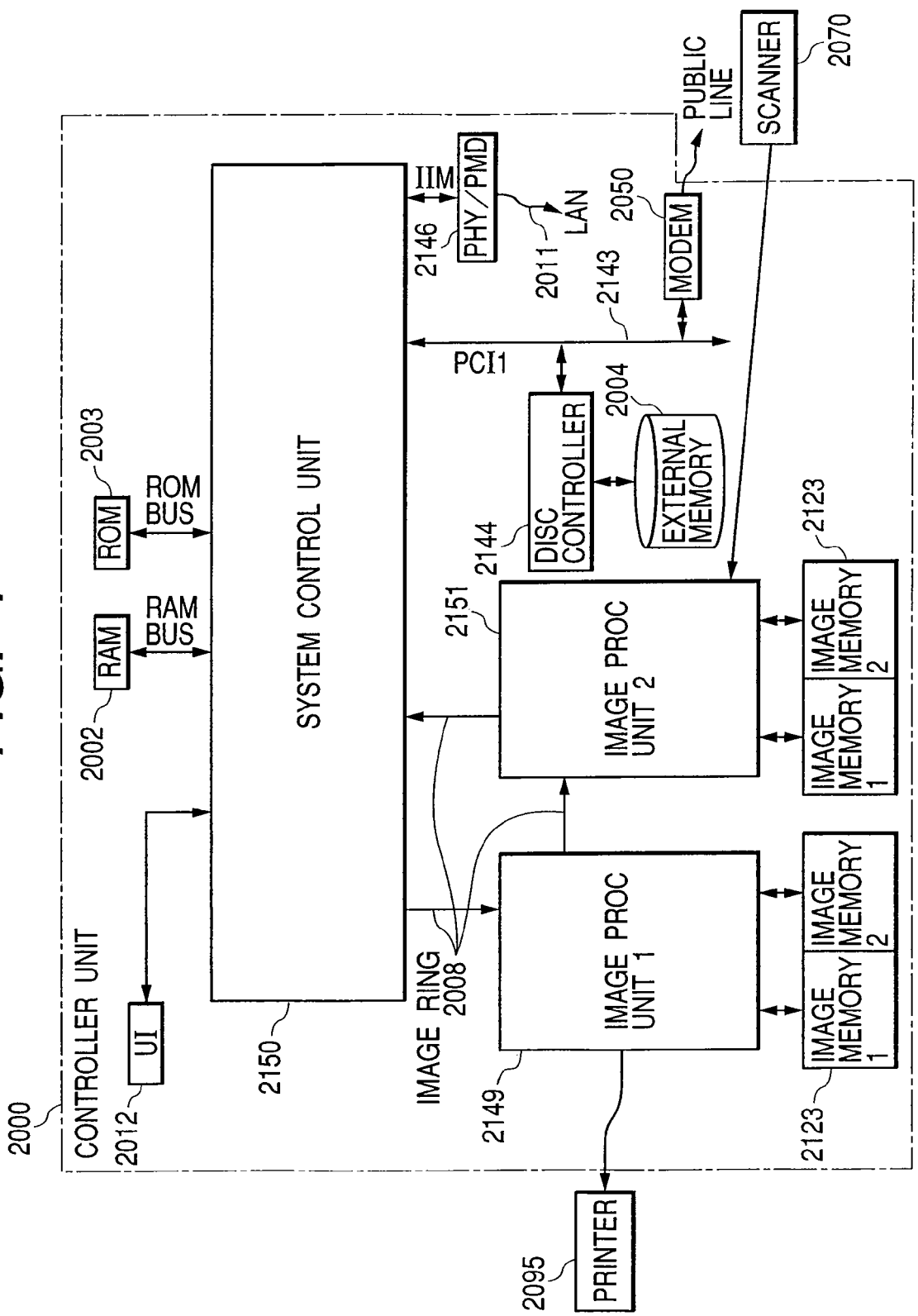
FIG. 1 is a block diagram for explaining a digital multifunctional machine according to the first embodiment.

FIG. 1 shows a digital multifunctional machine according to the first embodiment. In FIG. 1, numeral 2000 denotes a controller unit to which an image input/output control apparatus and an image processing apparatus according to the present invention are applicable.

Numeral 2150 denotes a system control unit which controls the digital multifunctional machine as a whole, numerals 2149 and 2151 respectively denote image processing units 1 and 2 which perform predetermined image processes to input image data and will be described later, and numeral 2008 denotes an image ring which connects the system control unit 2150, the image processing unit 1 (2149) and the image processing unit 2 (2151) like a ring.

Numeral 2012 denotes an operation unit (or UI (user interface)) which is used to perform various setting and operation instruction handling, numeral 2002 denotes a RAM (random-access memory), numeral 2003 denotes a ROM (read-only memory), numeral 2143 denotes general-purpose PCI buses 1 and 2, numeral 2004 denotes an external memory, and numeral 2144 denotes a disk controller. Numeral 2050 denotes a modem which is used to be connected to a public line, and numeral 2146 denotes a PHY/PMD (physical layer protocol/physical medium dependent) circuit which is connected to a LAN (local area network) 2011. The digital multifunctional machine can communicate with external devices through the modem 2050 and the PHY/PMD circuit 2146. A printer 2095 and an image memories 1 and 2 (2123) are connected to the image processing unit 1 (2149), and a scanner 2070 and a second image memories 1 and 2 (2123) are connected to the image processing unit 2 (2151).

Next, the structure of the controller unit 2000 based on the viewpoint of hardware will be explained.

Conventionally, the controller unit in the digital multifunctional machine such as a digital copying machine and the like is composed on a semiconductor substrate as a system LSI (large-scale integrated circuit). Particularly, in recent years, the controller unit which includes the circuits to achieve the functions of the system control unit 2150, the image processing unit 1 (2149) and the image processing unit 2 (2151) and the like as in the present embodiment composed on the single semiconductor substrate is proposed.

However, unlike the conventional structure, in the present embodiment, the circuits to achieve various functions are respectively composed on different units, i.e., semiconductor substrates, so as to be able to cope with changes of the functions of the apparatus and the like.

Concretely, the system control unit 2150 is composed on the single semiconductor substrate, and the image processing unit 1 (2149) and the image processing unit 2 (2151) are respectively composed on the single (i.e., individual) semiconductor substrates.

Incidentally, the semiconductor substrate described here can be translated into an IC (integrated circuit) chip. That is, in the present embodiment, the controller unit 2000 itself is a one plated printed circuit, and the system control unit 2150, the image processing unit 1 (2149) and the image processing unit 2 (2151) are mounted as the IC chips on the plated printed circuit.

It should be noted that the present invention is not limited to this, for example, the system control unit 2150, the image processing unit 1 (2149) and the image processing unit 2 (2151) may be mounted as the IC chips respectively on the different plated printed circuits.

Figures 2, 2A:
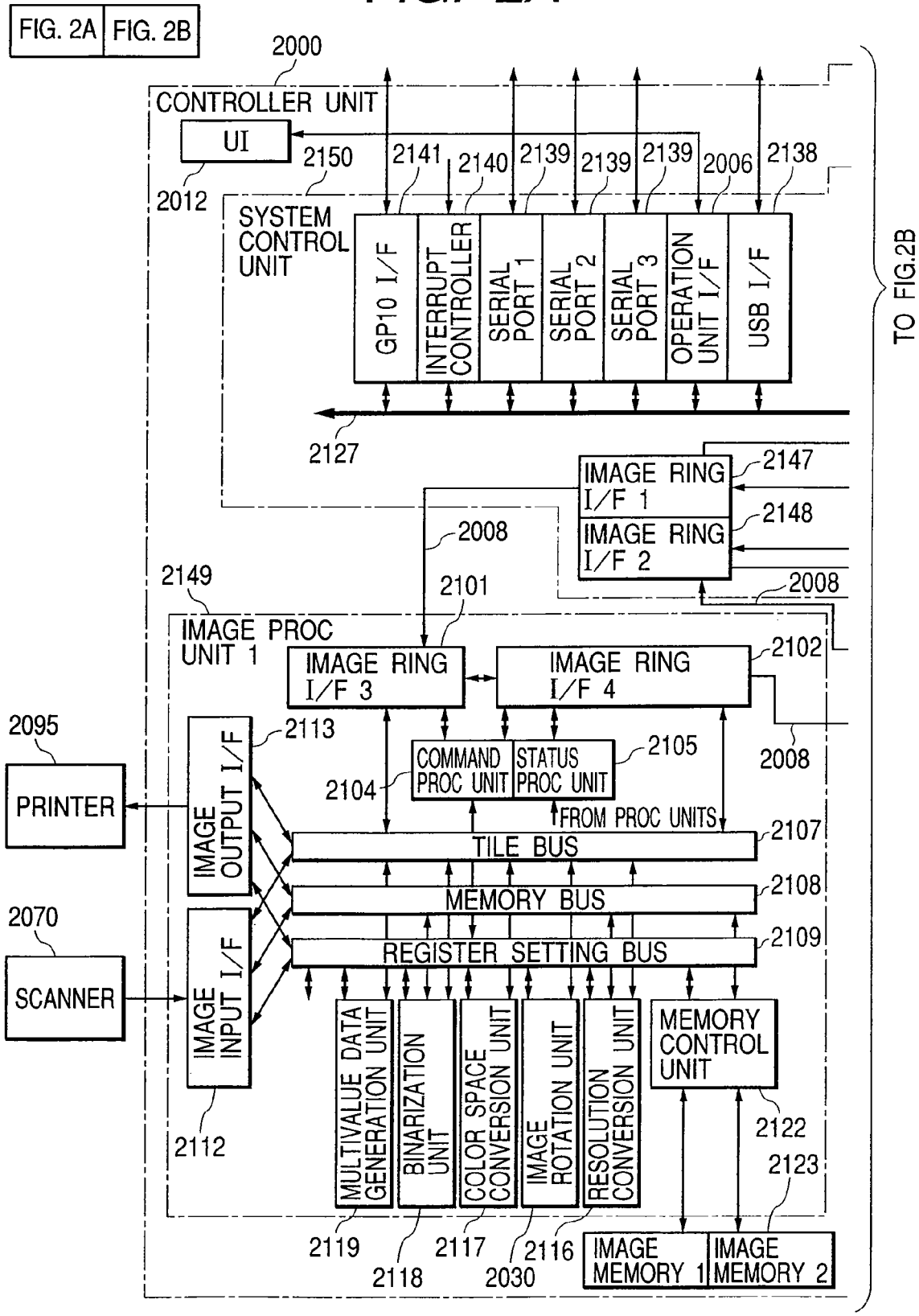
FIG. 2 which is composed of FIGS. 2A and 2B is a detailed block diagram for entirely explaining the internal structures of a system control unit 2150 and an image processing unit 1 (2149) in the first embodiment.
Figure 2B:
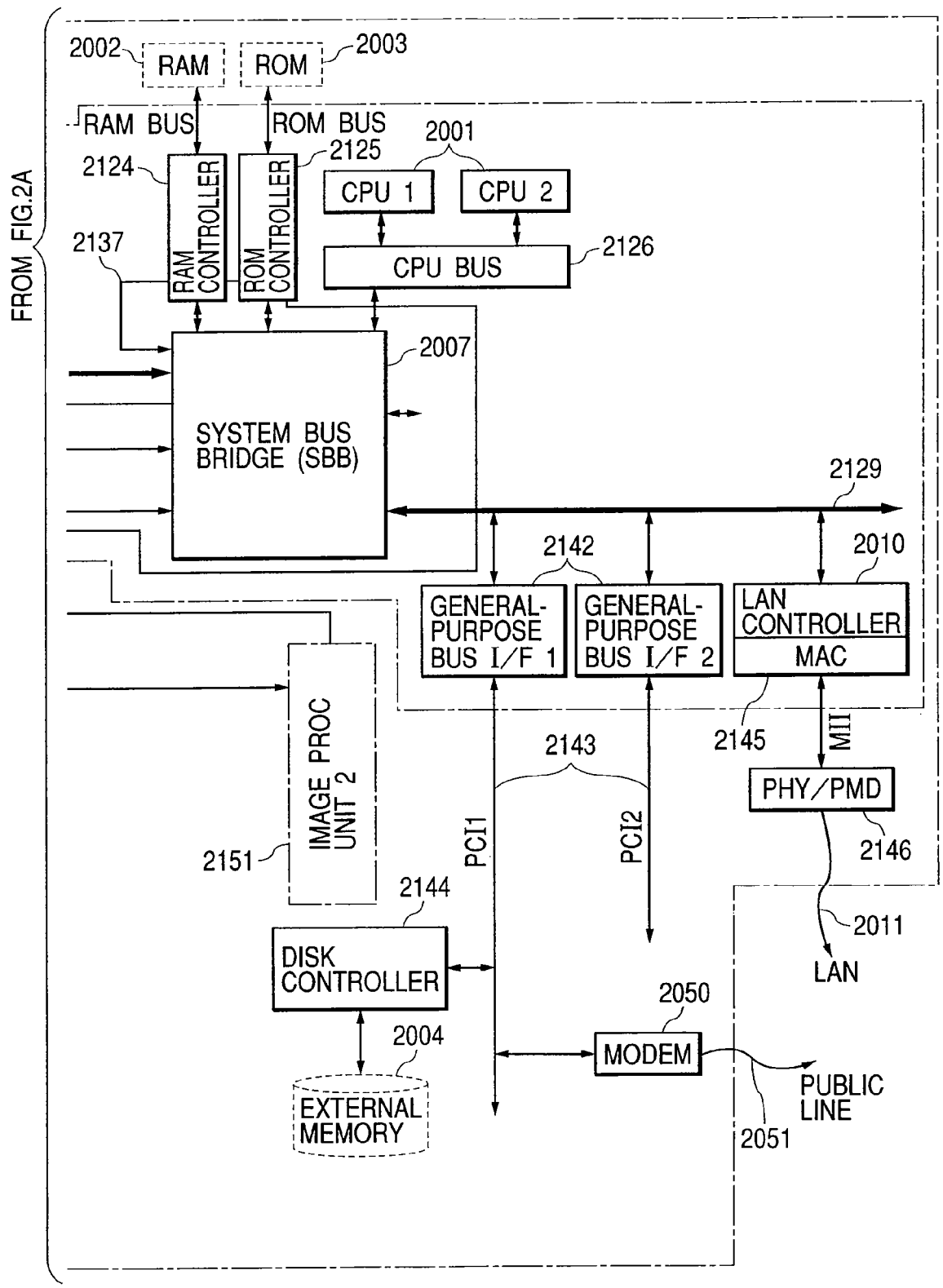

Next, FIG. 2 which is composed of FIGS. 2A and 2B shows the detailed entire structure for explaining the internal structures of the system control unit 2150 and the image processing unit 1 (2149). Although only the internal structure of the image processing unit 1 (2149) is shown in FIG. 2, it is assumed that the image processing unit 2 (2151) has the same structure as that of the image processing unit 1 (2149), and hereinafter, the same parts in the image processing units 1 (2149) and the image processing unit 2 (2151) will be explained by using the same reference numerals as long as there is no any specific attention.

The controller unit 2000 is connected to the scanner 2070 functioning as an image input device and the printer 2095 functioning as an image output device, and on the other hand, the controller unit 2000 is connected to the LAN 2011 and a public line (or WAN (wide area network)) 2051, whereby input and output of image information, input and output of device information, and image expansion of PDL (page description language) data are controlled.

CPU's (central processing units) 1 and 2 (2001) are the processors to control the system as a whole. The present embodiment shows an example that the two CPU's are used, and the two CPU's 1 and 2 are connected to a shared CPU bus 2126 and further connected to an SBB (system bus bridge) 2007.

The SBB 2007 is the bus switch to which the shared CPU bus 2126, a RAM controller 2124, a ROM controller 2125, an 10 (input and output) bus 1 (2127), an IO bus 2 (2129), an image ring I/F (interface) 1 (2147) and an image ring I/F 2 (2148) are connected. Numeral 2137 denotes a register access ring.

The RAM 2002 is the system working memory used when the CPU 2001 operates, and is also the image memory temporarily storing image data. The RAM 2002 is controlled by the RAM controller 2124.

The ROM 2003 which is the boot ROM storing a boot program is controlled by the ROM controller 2125.

The IO bus 1 (2127) is a kind of internal IO buses. A controller of a USB (universal serial bus) bus used as a standard bus, an USB I/F 2138, general-purpose serial ports 1, 2 and 3 (2139), an interrupt controller 2140 and a GPIO (general-purpose input and output) I/F 2141 are connected to the IO bus 1 (2127). It should be noted that the IO bus 1 (2127) includes a not-shown bus arbiter.

An operation unit I/F 2006 which is the interface unit with the operation unit (UI) 2012 outputs image data to be displayed on the operation unit 2012. Further, the operation unit I/F 2006 functions to transfer, to the CPU 2001, the information input by a user of this system from the operation unit 2012.

The IO bus 2 (2129) is a kind of the internal IO buses, and general-purpose bus I/F's 1 and 2 (2142) and a LAN controller 2010 are connected to the IO bus 2 (2129). It should be noted that the IO bus 2 (2129) includes a not-shown bus arbiter.

The general-purpose bus I/F's 1 and 2 (2142) which consist of the two same bus interfaces is the bus bridge to support standard IO buses. The present embodiment shows an example that the PCI buses 1 and 2 (2143) are adopted.

The external memory 2004 such as an HDD (hard disk drive) or the like which stores system software and image data. The external memory 2004 is connected to one of the PCI buses 1 and 2 (2143) through the disk controller 2144.

The LAN controller 2010 is connected to the LAN 2011 through an MAC (medium access control) circuit 2145 and the PHY/PMD circuit 2146 so as to input and output information, and the modem 2050 is connected to the public line 2051 so as to input and output information.

The image ring I/F 1 (2147) and the image ring I/F 2 (2148) functioning as packet transfer means are a DMA (direct memory access) controller to which the image ring 2008 for transferring image data at high speed to/from the SBB 2007 is connected and which transfers tiled data between the RAM 2002 and the image processing unit 1 (2149).

The image ring 2008 also functioning as the packet transfer means consists of a combination of a series of unidirectional connection paths. In the image processing unit 1 (2149), the image ring 2008 is connected to a command processing unit 2104, a status processing unit 2105 and a tile bus 2107 through an image ring I/F 3 (2101) and an image ring I/F 4 (2102).

The command processing unit 2104 is connected to a register setting bus 2109 as well as the image ring I/F, and writes a register setting request issued by the CPU 2001 and input through the image ring into the corresponding block connected to the register setting bus 2109. Besides, the command processing unit 2104 reads information from the corresponding register through the register setting bus 2109 and transfers the read information to the image ring I/F 4 (2102), on the basis of a register reading request issued by the CPU 2001.

The status processing unit 2105 observes the information of each image processing unit, generates an interrupt packet for issuing an interrupt to the CPU 2001, and then outputs the generated interrupt packet to the image ring I/F 4 (2012).

In addition to the above blocks (units), various function blocks (units) such as an image input I/F 2112, an image output I/F 2113 and plural rectangular image processing units are connected to the tile bus 2107.

In the present embodiment, a multivalue data generation unit 2119, a binarization unit 2118, a color space conversion unit 2117, an image rotation unit 2030 and a resolution conversion unit 2116 are mounted as the rectangular image processing units.

It should be noted that the scanner 2070 which should be disposed to the image processing unit 2 (2151) in FIG. 1 is connected to the image processing unit 1 (2149) in FIG. 2 so as to simplify the drawing and the description.

Raster image data subjected to a correction image process by the later-described scanner 2170 is input to the image input I/F 2112 in the image processing unit 2 (2151), the input raster image data is converted into rectangular data and also subjected to clock synchronization according to a predetermined method set by the register setting bus 2109, and the obtained rectangular data is output to the tile bus 2107.

Rectangular data from the tile bus 2107 is input to the image output I/F 2113 in the image processing unit 1 (2149), the rectangular data is converted into raster image data and also subjected to a clock rate change, and the obtained raster image data is output to the printer 2095.

It should be noted that the image input I/F in the image processing unit 1 (2194) and the image output I/F in the image processing unit 2 (2151) are not used in the present embodiment.

The image rotation unit 2030 rotates the image data, the resolution conversion unit 2116 changes the resolution of the image, the color space conversion unit 2117 converts color spaces of color and gray scale images, the binarization unit 2118 binarizes multivalue color and gray scale image data, and the multivalue data generation unit 2119 converts binary image data into multivalue image data.

A memory control unit 2122 which is connected to a memory bus 2108 performs image data writing, image data reading, a refresh operation for the image data (if necessary) and the like to the image memories 1 and 2 (2123) on the basis of previously set address division in accordance with a request of each image processing unit. In the present embodiment, it is assumed that an SDRAM (synchronous dynamic RAM) is used as the image memory.

Figure 3:
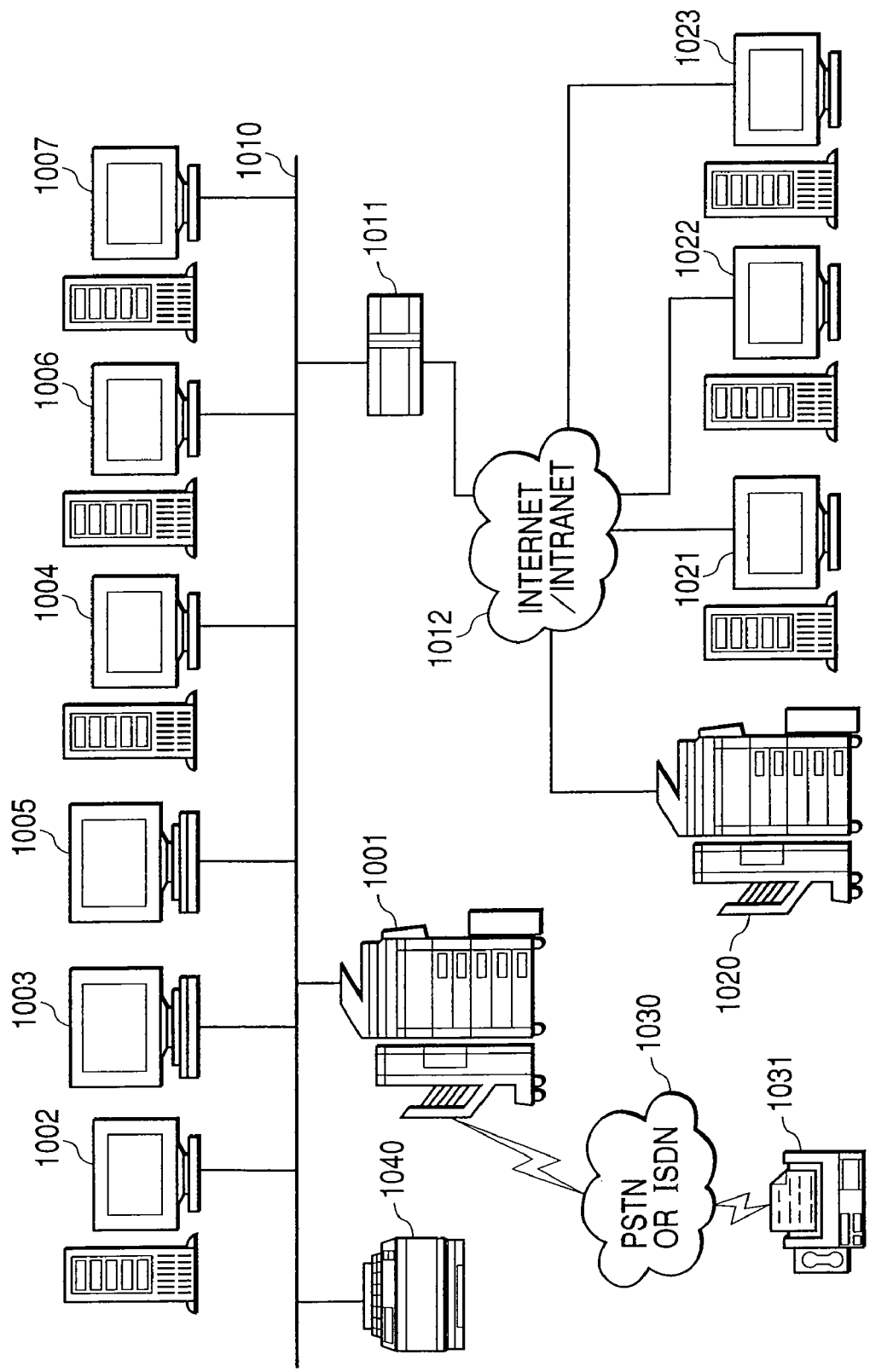
FIG. 3 is a diagram showing the entire structure of a network system including the digital multifunctional machine according to the first embodiment.

Next, FIG. 3 shows the entire structure of a network system which includes the digital multifunctional machine according to the present embodiment.

In FIG. 3, numeral 1001 denotes the digital multifunctional machine in the present embodiment which is controlled by the controller to which the image output control apparatus and the image processing apparatus according to the present invention are applicable.

The digital multifunctional machine 1001 which consists of the scanner and the printer can send an image read from the scanner to a LAN 1010 and print out an image received from the LAN 1010.

Besides, the digital multifunctional machine 1001 can transmit an image read from the scanner to a PSTN or ISDN (Public Switched Telephone Network or Integrated Services Digital Network) 1030 by a not shown facsimile means and print out an image received from the PSTN or ISDN 1030 by the printer. Numeral 1002 denotes a database server which manages a binary image and a multivalue image read by the digital multifunctional machine 1001, as databases.

Numeral 1003 denotes a database client of the database server, by which read, search and the like of the image data stored in the database server 1002 can be performed.

Numeral 1004 denotes an electronic mail server which can receive the image read by the digital multifunctional machine 1001, as an attachment of an electronic mail. Numeral 1005 denotes an electronic mail client by which the electronic mail received by the electronic mail server 1004 can be read and which can transmit an electronic mail.

Numeral 1006 denotes a WWW (World Wide Web) server which provides an HTML (Hypertext Markup Language) document to the LAN 1010. The HTML document provided by the WWW server 1006 can be printed out by the digital multifunctional machine 1001. Numeral 1007 denotes a DNS (domain name server).

Numeral 1011 denotes a router which connects the LAN 1010 to an Internet/intranet 1012. Further, apparatuses 1021, 1022, 1023 and 1020 which are respectively the same as the above database server 1002, the WWW server 1006, the electronic mail server 1004 and the digital multifunctional machine 1001 are connected to the Internet/intranet 1012. On the other hand, the digital multifunctional machine 1001 can transmit/receive data to/from a facsimile apparatus 1031 through the PSTN or ISDN 1030.

Further, a printer 1040 is connected on the LAN 1010 to be able to print out the image read by the digital multifunctional machine 1001.

Next, a packet format of packet data which is processed in the controller unit 2000 to which the image input/output control apparatus and the image processing apparatus according to the present invention are applicable will be explained.

In the controller unit 2000 according to the present embodiment, the image data, the command by the CPU 2001, the interrupt information issued by each block (unit) and the like are transferred in packet formats. The present embodiment uses three different kinds of packets, i.e., a data packet shown in FIG. 4, a command packet shown in FIG. 6, and an interrupt packet shown in FIG. 7.

First, the data packet will be explained with reference to FIG. 4. In the present embodiment, an example that the image data is divided into image data (Image Data+padding) 3002 of tile unit consisting of 32 pixels×32 pixels to be managed is shown.

Necessary header information (header) 3001 and image additional information (Z Data+padding) 3003 are added to the image of the tile unit to generate the data packet. Here, the information included in the header information 3001 will be explained.

The type of the packet is discriminated by a packet type (Pckt Type) 3004 in the header information 3001, and a chip ID (Chip ID) 3005 indicates an ID (identification) of a chip being the target to which the packet is transmitted. A data type (Data Type) 3006 indicates a type of data, a page ID (Page ID) 3007 indicates a page, and a job ID (Job ID) 3008 stores an ID to be used in management by software.

The number of the tile is represented by symbol YnXn obtained by combining a tile coordinate (Packet ID Y-coordinate) 3009 in the Y direction and a tile coordinate (Packet ID X-coordinate) 3010 in the X direction. There are two kinds of data packet, i.e., in one packet the image data is compressed, and in the other packet the image data is not compressed. The present embodiment shows the data packet in which the image data is not compressed. These two kinds of image data are discriminated by a compression flag (Compress Flag) 3017.

A process instruction (Process Instruction) 3011 is set by left justify in the order of process, and after the process each processing unit (e.g., above rectangular image processing unit) shifts the process instruction 3011 leftward by eight bits. The process instruction 3011 includes eight sets of unit ID (Unit ID) 3019 and mode (Mode) 3020, the unit ID 3019 designates each processing unit, and the mode 3020 designates an operation mode in each processing unit. Thus, the one packet can be processed continuously by the eight units.

A packet length (Packet Byte Length) 3012 indicates the number of total bytes of the packet, an image data length (Image Data Byte Length) 3015 indicates the number of bytes of the image data, and a Z data length (Z Data Byte Length) 3016 indicates the number of bytes of the image additional information. An image data offset (Image Data Offset) 3013 and a Z data offset (Z Data Offset) 3014 respectively indicate offsets from the head of the data packet. Numeral 3018 denotes thumbnail data (thumbnail Data).

Figure 5:
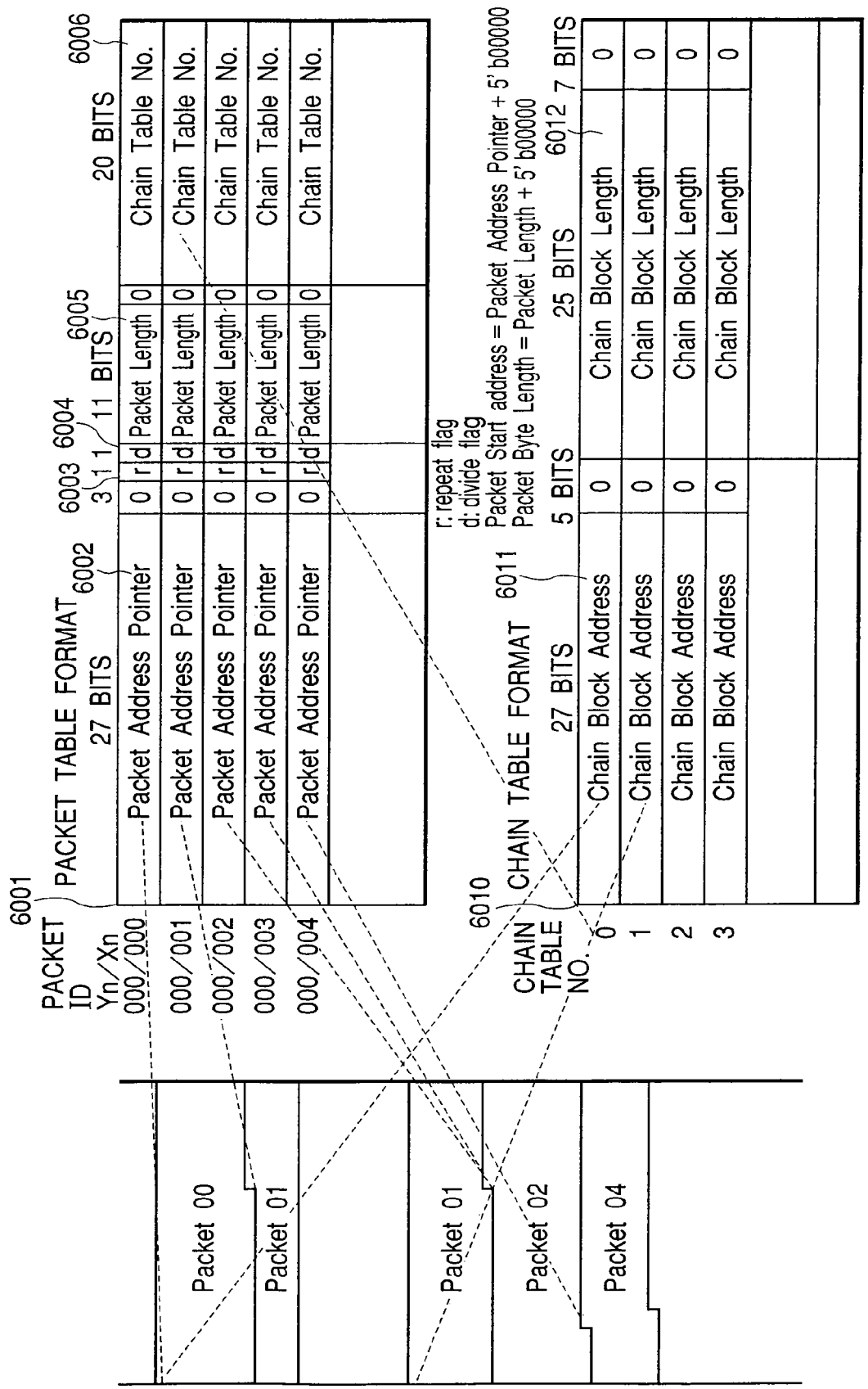
FIG. 5 is a diagram for explaining a packet table used in the controller unit 2000.

Next, a packet table will be explained with reference to FIG. 5. Each packet is managed by a packet table 6001 which includes the following components. If "0" is added to each table value by five bits, a leading address (Packet Address Pointer) 6002 of the packet and a packet length (Byte Length) 6005 are obtained, and the relations "Packet Address Pointer 27 bits+5b00000=packet leading address" and "Packet Length 11 bits+5b00000=packet length" are satisfied. Here, it is assumed that the packet table 6001 and a chain table 6010 are not divided.

The packet table 6001 always ranks in the scanning direction, the tile numbers ranks in the order of Yn/Xn=0000/000, 000/001, 000/002, . . . , an E entry of the packet table 6001 uniquely indicates the one tile, and a next entry of Yn/Xmax is Yn+1/$X_0$.

If the data of the packet is completely the same as that of the one-previous packet, such the packet is not written on the memory, and the leading address and the packet length same as those in the first entry are stored in the entry of the packet table, whereby such a format as one packet data is indicated by two table entries is given. In this case, a repeat flag (Repeat Flag) 6003 of the second table entry is set.

If the packet is divided into the plural portions by a chain DMA, a division flag (Divide Flag) 6004 is set, and a chain table number (Chain Table No.) 6006 of the chain block including the leading portion of the packet is set.

The entry of the chain table 6010 consists of a chain block address (Chain Block Address) 6011 and a chain block length (Chain Block Length) 6012, and "0" is stored in both the last entry of the address and the last entry of the data length.

Figure 6:
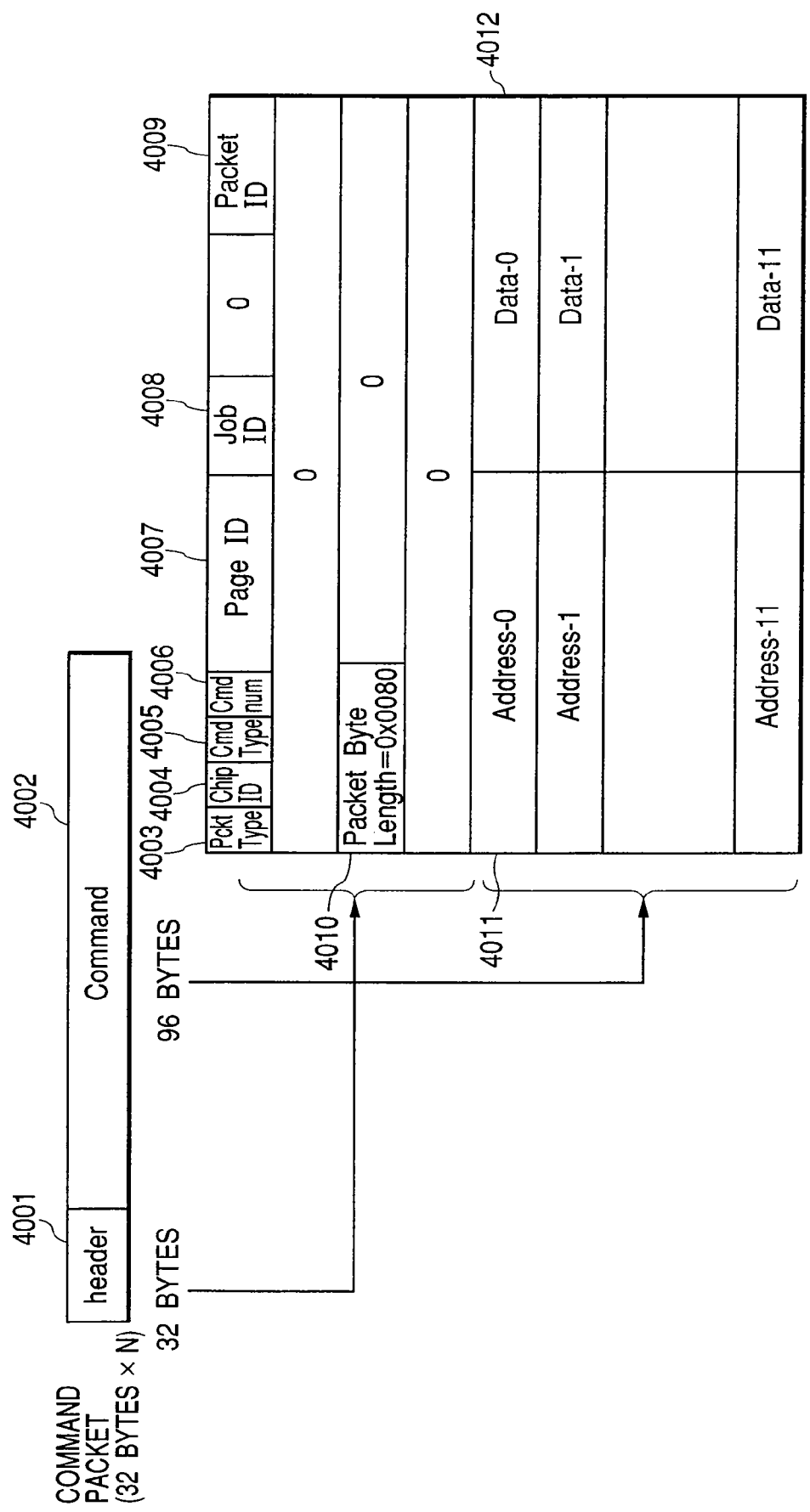
FIG. 6 is a diagram for explaining a command packet used in the controller unit 2000.

Next, the command packet will be explained with reference to FIG. 6.

The command packet is to access the register setting bus 2109, and it is possible by using the command packet to access from the CPU 2001 to the image memory 2123.

Following header information is stored in a header (header) 4001. That is, a packet type (Pckt Type) 4003 stores a packet type, a chip ID (Chip ID) 4004 stores an ID representing the image processing unit to which the command packet is transmitted, a page ID (Page ID) 4007 stores a page to be used in management by software, and a job ID (Job ID) 4008 stores a job ID to be used in management by software.

Since a packet ID (Packet ID) 4009 is represented one-dimensionally, only the X coordinate (X-coordinate) of the data packet is used. A packet length (Packet Byte Length) 4010 is fixed by 128 bytes.

In a packet data portion (Command) 4002, 12 commands each of which consists of a set of an address (Address) 4011 and data (Data) 4012 can be maximumly stored. A command type (write or read) is indicated by a command type (Cmd Type) 4005, and the number of the commands is indicated by a command number (Cmd num) 4006.

Figure 7:
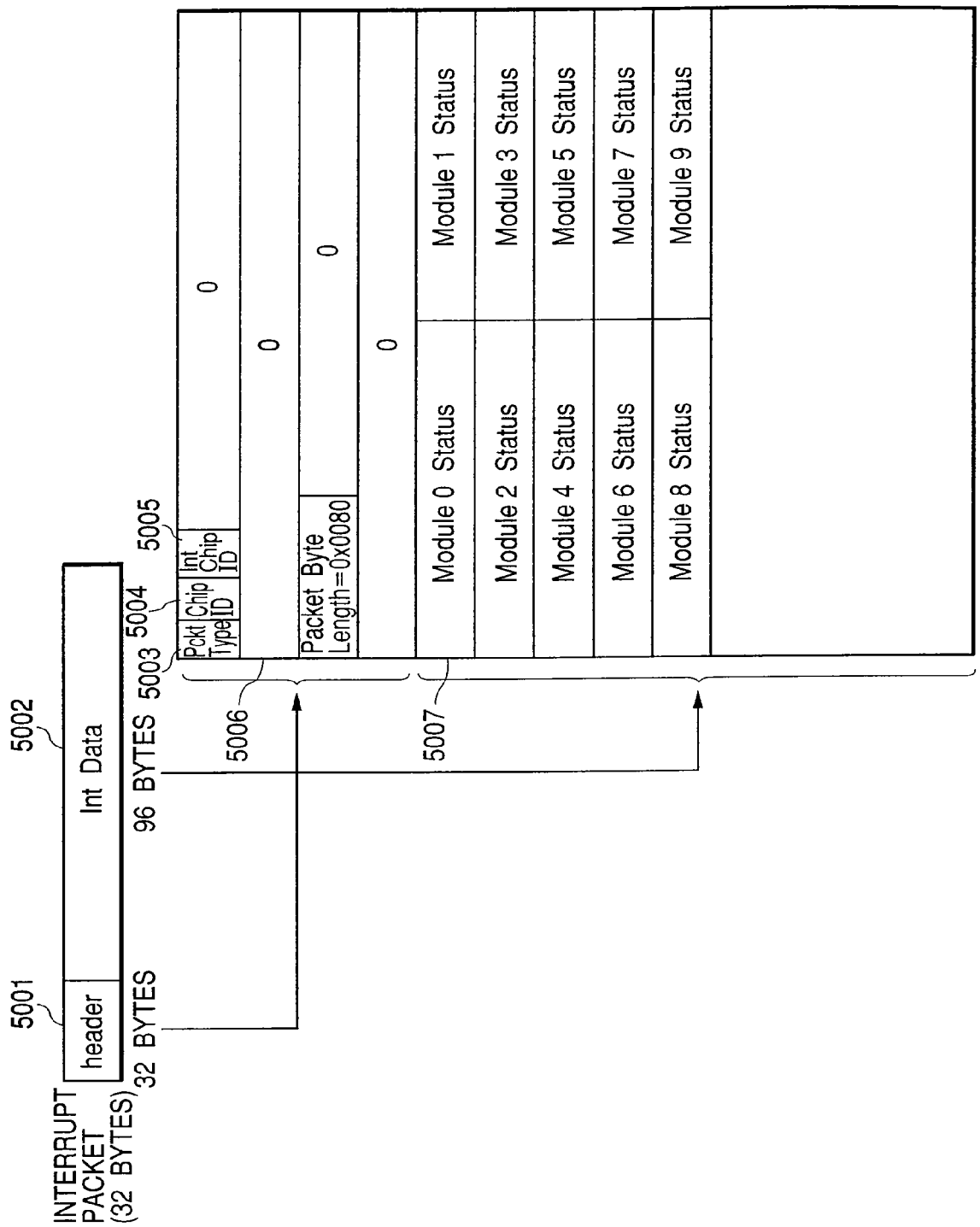
FIG. 7 is a diagram for explaining an interrupt packet used in the controller unit 2000.

Finally, the interrupt packet will be explained with reference to FIG. 7.

The interrupt packet is to notify the CPU 2001 of an interrupt from the image processing unit. After the status processing unit 2105 transmits the interrupt packet, this unit can not transmit any interrupt packet until next packet transmission is permitted.

Header information is stored in a header (header) 5001, and a packet type is stored in a packet type (Pckt Type) 5003. In the header information, a packet length (Packet Byte Length) 5006 is fixed by 128 bytes. Further, in a packet data portion (Int Data) 5002, status information (Module Status) 5007 of each internal module (e.g., each rectangular image processing unit, and an I/O interface) of the image processing unit is stored. The status processing unit 2105 can collect the status information of each module in the image processing unit and collectively send the obtained information to the system control unit 2150.

An ID representing the system control unit 2150 to which the interrupt packet is transmitted is stored in a chip ID (Chip ID) 5004, and an ID representing the image processing unit from which the interrupt is transmitted is stored in an interrupt chip ID (Int Chip ID) 5005.

Figure 8:
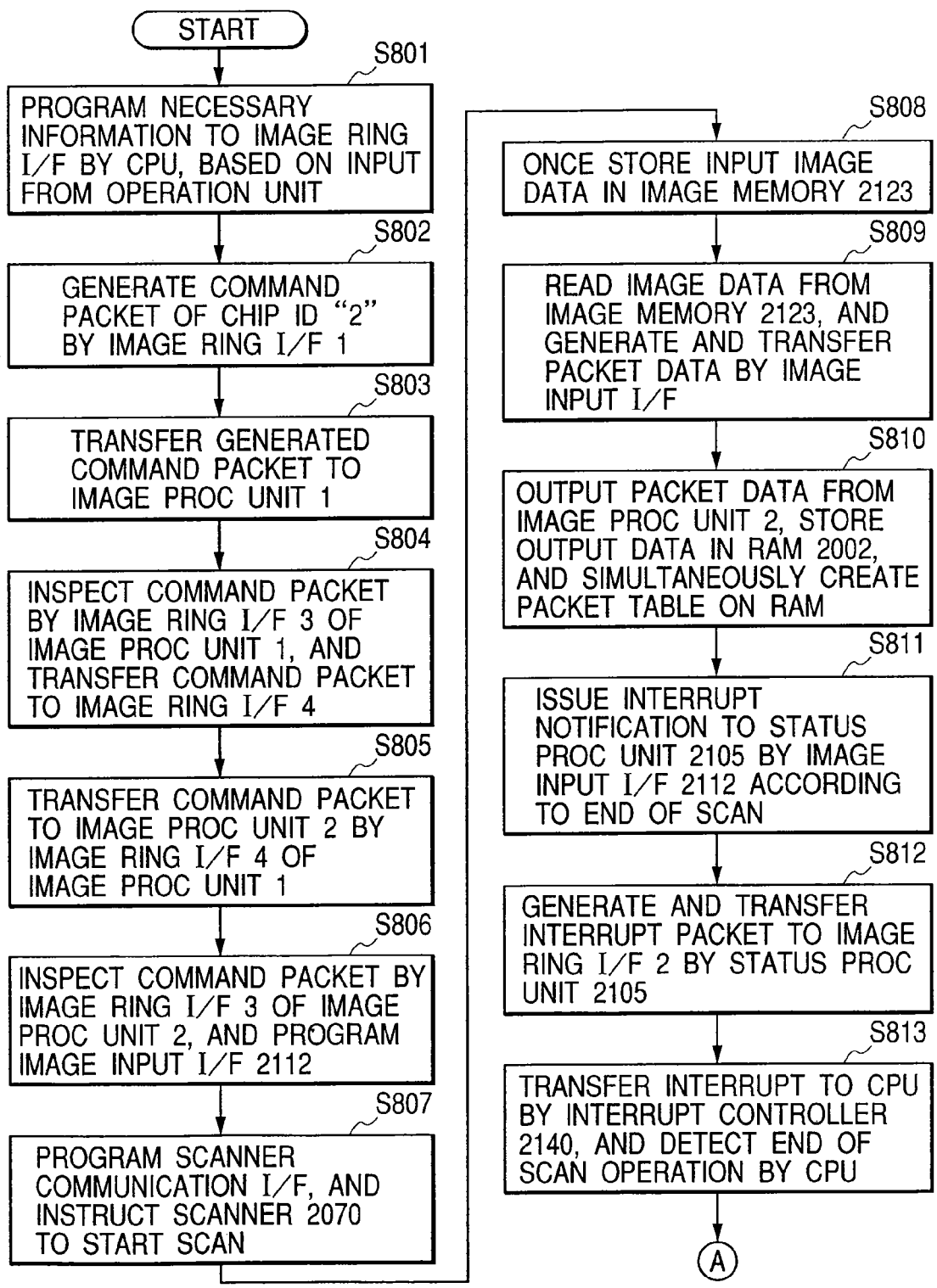
FIG. 8 is a flow chart for explaining a scanning operation in case of instructing the digital multifunctional machine in the first embodiment to perform a copying job.
Figure 9:
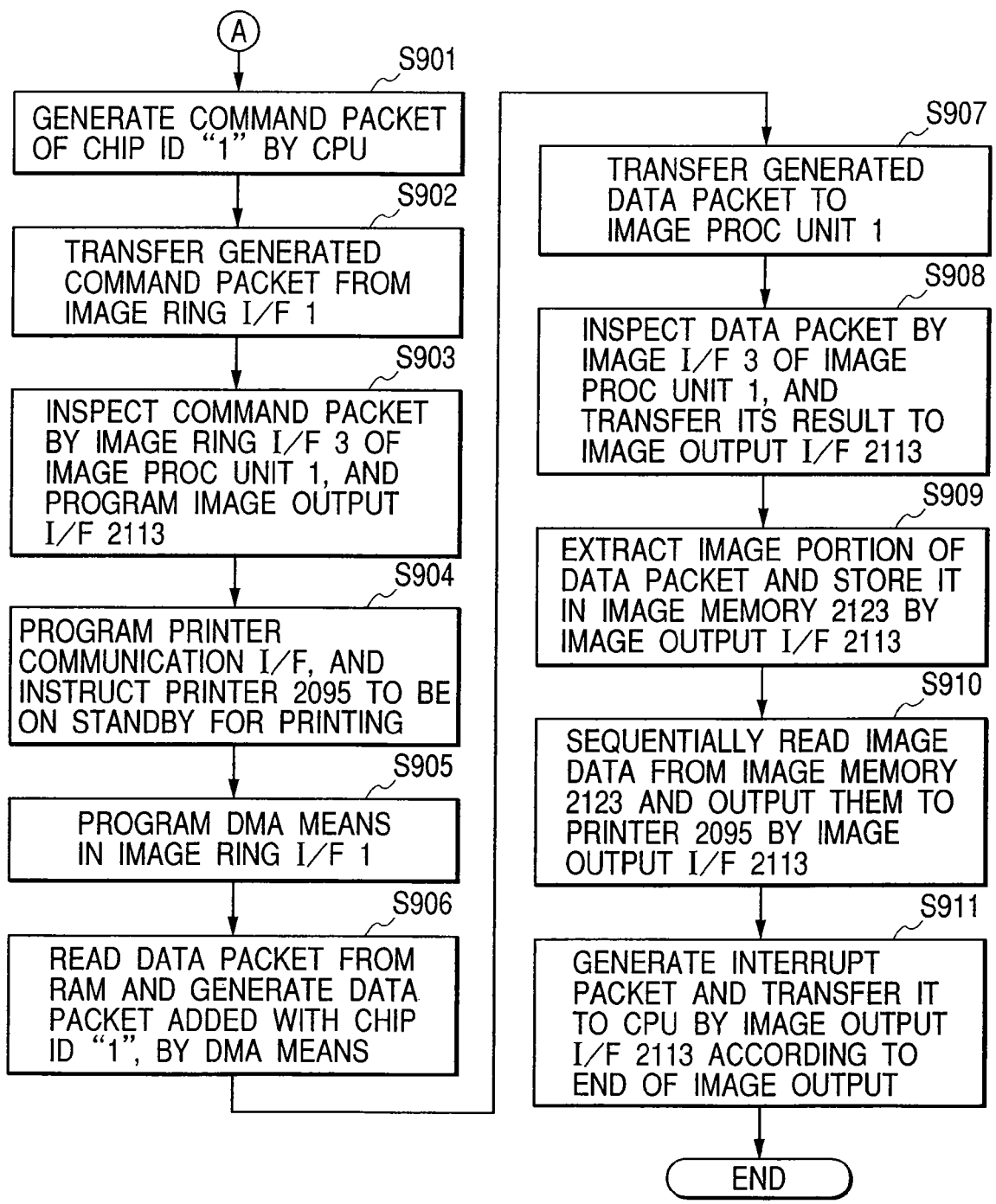
FIG. 9 is a flow chart for explaining a printing operation in case of instructing the digital multifunctional machine in the first embodiment to perform the copying job.

Hereinafter, as a typical process which is performed by the controller unit 2000, a process in a case where a user instructs a copying job from the operation unit 2012 will be explained with reference to the flow charts shown in FIGS. 8 and 9.

First, the process that the copying job is received by the controller unit 2000, a scanning operation by using the scanner 2070 starts, and then the scanning operation ends will be explained with reference to FIG. 8.

The CPU 2001 receives the information from the operation unit I/F 2006, and programs the necessary information such as the number of the transferred packets, the image storage address on the RAM 2002 and the like to the image ring I/F 2 (2148) on the basis of the information such as a sheet size and the like (step S801).

Then, the CPU 2001 programs the command packet generation register in the image ring I/F 1 (2147) through the register access ring 2137, and generates the command packet to set the necessary information such as the sheet size, color space information and the like to the image input I/F 2112. In this case, the CPU 2001 sets the chip ID 4004 of the command packet to "2" representing the image processing unit 2 (2151) (step S802).

After then, the image ring I/F 1 (2147) transfers the command packet to the image processing unit 1 (2149) through the image ring 2008 (step S803).

The image ring I/F 3 (2101) of the image processing unit 1 (2149) inspects the chip ID of the command packet. Here, since the chip ID is not "1"0 representing own chip's ID, the command packet is transferred to the image ring I/F 4 (2102) (step S804).

The image ring I/F 4 (2102) again transfers the command packet to the image processing unit 2 (2151) through the image ring 2008 (step S805).

The chip ID of the command packet reached the image processing unit 2 (2151) is inspected by the image ring I/F 3 (2101) in the image processing unit 2 (2151). Here, the chip ID of the command packet and the own chip's ID are coincident by "2". In this case, the command processing unit 2104 programs the image input I/F 2112 through the register setting bus 2109, on the basis of the command data and the header information of the command packet (step S806).

Then, similarly, the CPU 2001 programs a scanner communication interface in the image input I/F 2112 by using the command packet, and instructs the scanner 2070 to start the scanning operation (step S807).

The image information input by the scanner 2070 is once stored in the image memory 2123 controlled by the memory control unit 2122, through the image input I/F 2112 and the memory bus 2108 (step S808).

The stored image data is again read for each 32×32 pixels by the image input I/F 2112. Then, the header information such as the packet type (Pckt Type) 3004, the chip ID (Chip ID) 3005, the data type (Data Type) 3006, the page ID (Page ID) 3007, the job ID (Job ID) 3008, the tile coordinate (Packet ID Y-coordinate) 3009 in the Y direction, the tile coordinate (Packet ID X-coordinate) 3010 in the X direction, the compression flag (Compress Flag) 3017, the process instruction (Process Instruction) 3011, the packet length (Packet Byte Length) 3012 and the like is added to the image data to generate the data packet, and the generated data packet is output to the tile bus 2107 (step S809).

The data packets are sequentially generated. Like the command packet, the generated data packet is transferred to the image ring I/F 2 (2148) through the image ring I/F 4 (2102) and the image ring 2008 on the basis of the chip ID, and then the transferred data packets are sequentially stored in the RAM 2002 on the basis of the information programmed to the image ring I/F 2 (2148). At the same time, the image ring I/F 2 (2148) creates the packet table 6001 on the RAM 2002 (step S810).

After the scanning operation of one page ended, such an end is transferred to the image input I/F 2112 by using a scanner communication means. The image input I/F 2112 notifies the status processing unit 2105 of an interrupt by using an interrupt signal (not shown) (step S811).

The status processing unit 2105 in the image processing unit 2 (2151) generates the interrupt packet (FIG. 7) and then transfers the generated interrupt packet to the image ring I/F 2 (2148) (step S812).

The image ring I/F 2 (2148) interprets the interrupt packet and then transfers the interrupt to the interrupt controller 2140 by using the interrupt signal (not shown). The interrupt is transferred to the CPU 2001 by the interrupt controller 2140, whereby the CPU 2001 detects the end of the scanning operation (step S813).

If the scanning operation ends, a printing operation using the printer 2095 starts. Thus, the process of the controller unit 2000 in the printing operation will be explained with reference to FIG. 9.

The CPU 2001 generates the command packet of the chip ID "1" through the register access ring 2137 (step S901).

Then, the CPU 2001 transfers the generated command packet from the image ring I/F 1 (2147) to the image processing unit 1 (2149) through the image ring 2008 (step S902).

The image ring I/F 3 (2101) of the image processing unit 1 (2149) inspects the input command packet. Here, since the chip ID is "1", the necessary information for the image output process is set to the image output I/F 2113 of the image processing unit 1 (2149) through the command processing unit 2104 and the register setting bus 2109 on the basis of the command data of the command packet (step S903).

Similarly, by using the command packet, the CPU 2001 instructs the printer 2095 to be on standby for the printing by a printer communication means provided in the image output I/F 2113 of the image processing unit 1 (2149) (step S904).

Subsequently, the CPU 2001 programs the memory address where the packet table exists and the like to a DMA means provided in the image ring I/F 1 (2147) (step S905).

The DMA means in the image ring I/F 1 (2147) reads the data packet from the RAM 2002 and generates the data packet in which the chip ID "1" has been added to the header, on the basis of the programmed information (step S906).

Then, the DMA means in the image ring I/F 1 (2147) transfers the generated data packet to the image processing unit 1 (2149) through the image ring 2008 (step S907).

The image ring I/F 3 (2101) of the image processing unit 1 (2149) inspects the input data packet. Here, since the chip ID is "1", the data packets are sequentially transferred to the image output I/F 2113 through the image ring I/F 3 (2101) and the tile bus 2107 (step S908).

The image output I/F 2113 extracts the image portion from the received data packet and stores the image data in the image memory 2123 (step S909).

When the image data of the necessary pixels is stored in the image memory 2123, the image output I/F 2113 sequentially reads the image data from the image memory 2123 and outputs them to the printer 2095 (step S910).

Thus, the user can obtain image prints being the copying results. When the image output of the necessary number of pixels ends, like the case of the scanning operation, an end interrupt is transferred to the CPU 2001 by the interrupt packet (step S911).

As above, the copying operation in which the scanning operation using the scanner 2070 and the image processing unit 2 (2151) is combined with the printing operation using the printer 2095 and the image processing unit 1 (2149) was explained.

As apparent from the above explanation, the printing operation and the scanning operation are performed simultaneously when the copying operation of the plural pages is performed. However, even in such a case, a scanning data packet and a printing data packet never pass the same path in the image ring 2008.

Since the image ring 2008 consists of the combination of the unidirectional connection paths, a low-cost transfer means can be provided without causing a decrease in processing speed due to the competition for the bus or the like.

Further, since the rectangular image processing units such as the resolution conversion unit 2116, the image rotation unit 2030 and the like are used in the scanning operation and the printing operation, there is some fear that the image data process in the scanning operation competes with the image data process in the printing operation.

However, by adopting the controller structure according to the present embodiment, even if such the competition occurs, the resolution conversion unit and the image rotation unit provided respectively in the image processing unit 1 (2149) and the image processing unit 2 (2151) can be used, whereby a decrease in processing speed due to the competition does not occur.

As explained above, in the controller of the digital multifunctional machine according to the present embodiment, the semiconductor substrate composing the system control unit, the semiconductor substrate composing the image processing unit 1 and the semiconductor substrate composing the image processing unit 2 are provided as the independent (i.e., different) substrates respectively, these substrates are connected by the image rings, and the various data are transferred among these substrates in the form of the packet data.

Thus, even if the processing functions are changed and/or added, it is possible to easily change the structure of the controller. Besides, since the data transfer is performed unidirectionally by the image rings, a decrease in processing speed due to the competition for the bus can be lowered without increasing the number of parts used to the bus control and the like.

Besides, when the command is managed and exchanged between the system control unit and each image processing unit connected like the ring as above, it is used the command packet in which the header including the chip ID for discriminating which image processing unit the processing setting should be performed in has been added to the command data for performing the image process and the image input/output process in each processing unit, the operation processing setting of the connected external apparatus, and the like.

Thus, since the system control unit can easily perform the different processing setting to each image processing unit, it is possible to avoid the competition for the image processing unit in parallel processes and the like without increasing loads to the system control unit.

Besides, the image data input by the scanner is transferred from the image processing unit 2 to the system control unit on the basis of the setting by the command packet, and the image data received from the image processing unit 2 is stored in the RAM of the system control unit. After the image data of one page was stored in the RAM, the image data in the RAM is transferred to the image processing unit 1, and the image data received from the system control unit is output from the image processing unit 1 to the printer on the basis of the setting by the command packet.

By performing the data transfer process with use of the image ring being the unidirectional bus, the copying process can be performed without a decrease in the processing speed due to the competitions for the image processing unit, the bus and the like.

Similarly, when the image data is managed and exchanged between the system control unit and each image processing unit connected like the ring as above, it is used the command packet in which the header including the chip ID for discriminating which image processing unit the processing setting should be performed in has been added to the image data divided into the rectangular units each having a predetermined size.

Thus, since the system control unit to perform the image process can be designated based on the unit of rectangular image data, it is possible to avoid the competition for the image process using the rectangular processing unit in the image processing unit when the plural functional operations are performed.

(Second Embodiment)

Figure 10:
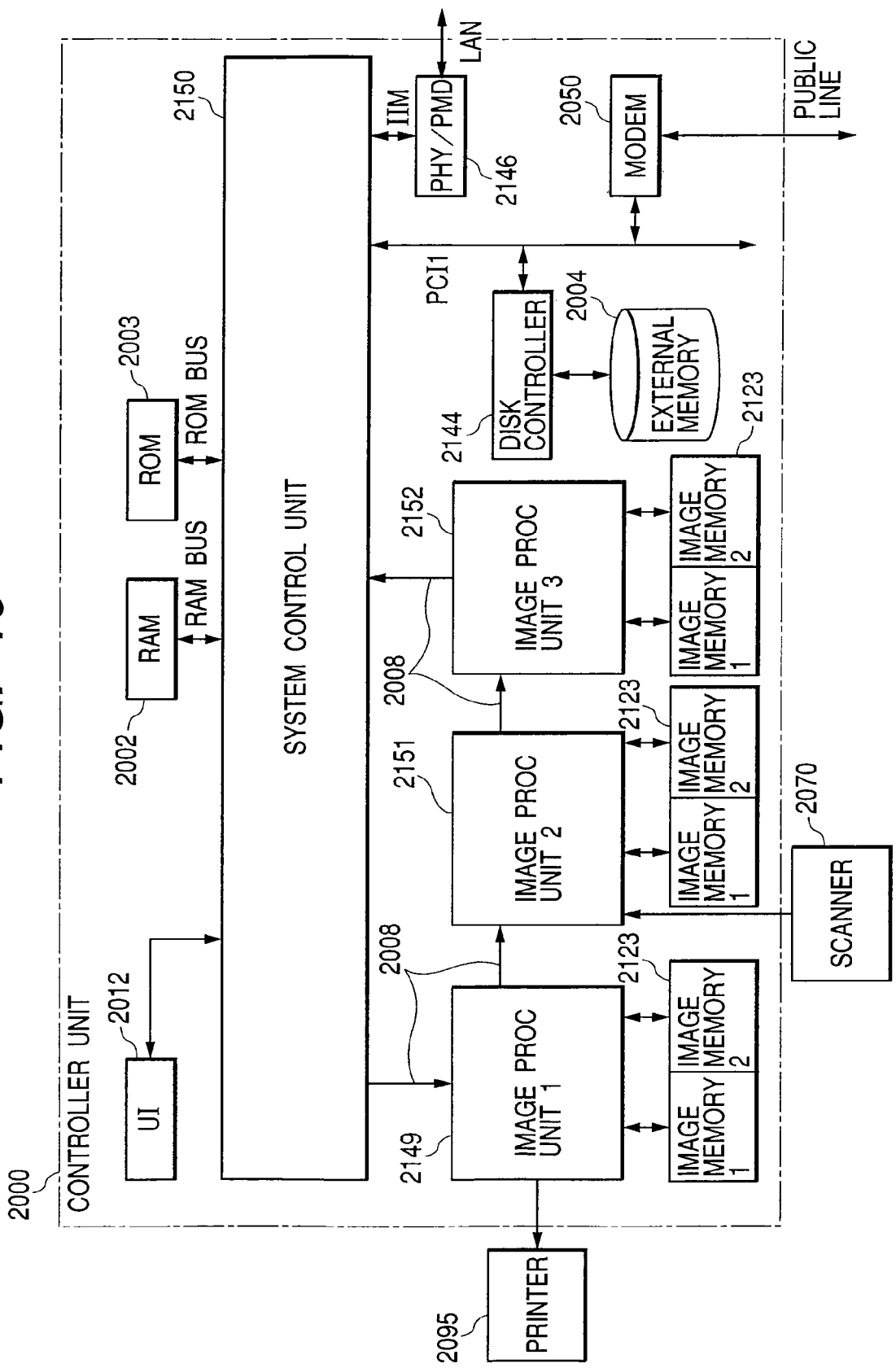
FIG. 10 is a block diagram for explaining a digital multifunctional machine according to the second embodiment.

In the present embodiment, further another image processing unit is added to the controller unit explained in the first embodiment. FIG. 10 shows a digital multifunctional machine according to the present embodiment.

As shown in FIG. 10, an image processing unit 3 (2152) is newly added in the present embodiment. Here, like the first embodiment, a system control unit 2150 is composed on a single semiconductor substrate, and an image processing unit 1 (2149), an image processing unit 2 (2151) and the image processing unit 3 (2152) are respectively composed on the single (i.e., individual) semiconductor substrates.

In the digital multifunctional machine shown in FIG. 10, numeral 2000 denotes a controller unit to which the image input/output control apparatus and the image processing apparatus according to the present invention are applicable. Numeral 2150 denotes a system control unit which controls the digital multifunctional machine as a whole.

Numerals 2149, 2151 and 2152 respectively denote the image processing units 1, 2 and 3 which perform predetermined image processes to input image data and will be later described in detail. Numeral 2008 denotes an image ring which connects the system control unit 2150, the image processing unit 1 (2149), the image processing unit 2 (2151) and the image processing unit 3 (2152) like a ring.

Figure 11:
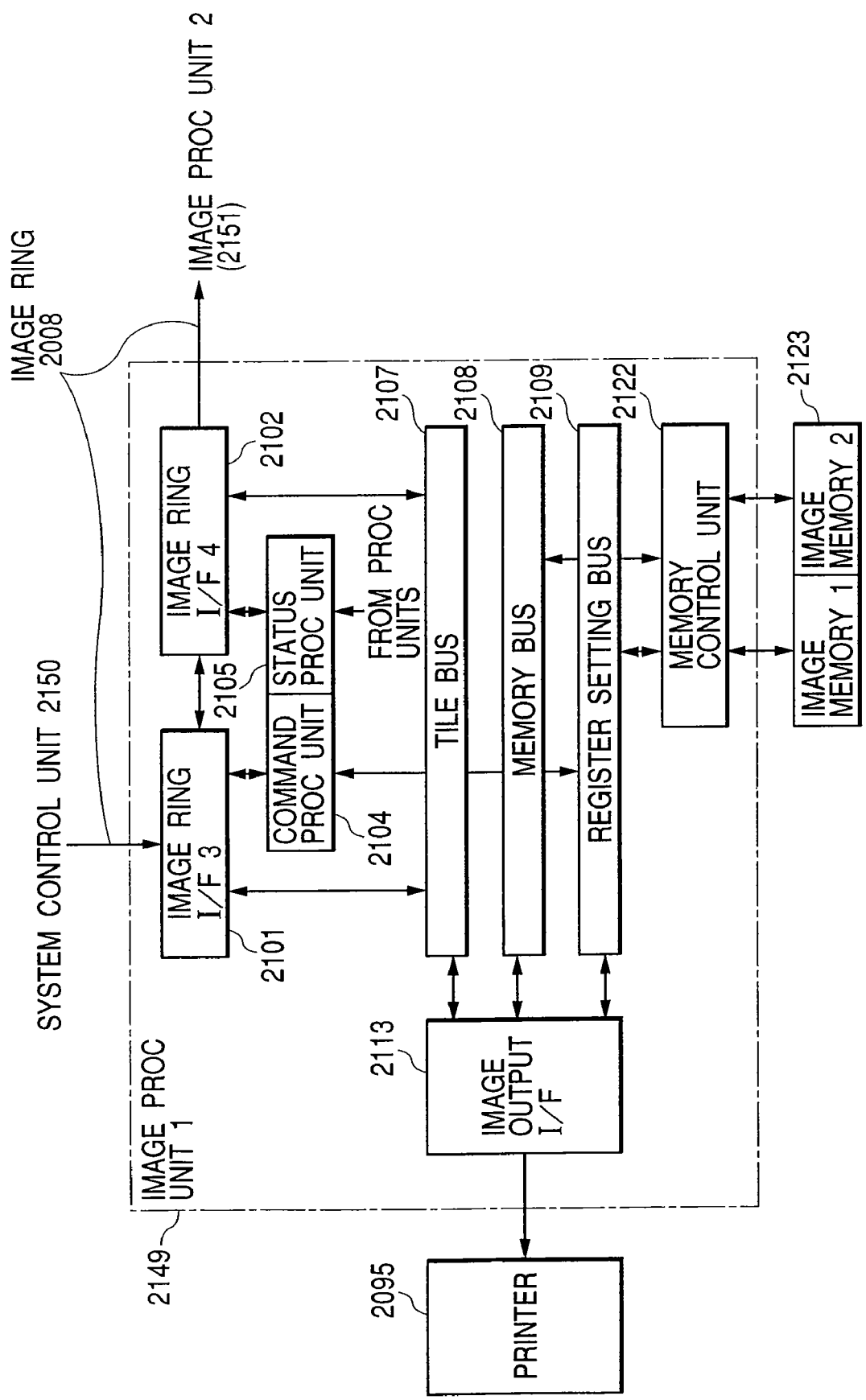
FIG. 11 is a detailed block diagram for entirely explaining the internal structure of an image processing unit 1 in the second embodiment.

Next, FIG. 11 is a detailed block diagram for entirely explaining the internal structure of the image processing unit 1 (2149).

The image ring 2008 functioning as the packet transfer means consists of a combination of a series of unidirectional connection paths. In the image processing unit 1 (2149), the image ring 2008 is connected to a command processing unit 2104, a status processing unit 2105 and a tile bus 2107 through an image ring I/F 3 (2101) and an image ring I/F 4 (2102).

In addition to the above blocks (units), an image output I/F 2113 is connected to the tile bus 2107.

Rectangular data from the tile bus 2107 is input to the image output I/F 2113 in the image processing unit 1 (2149), the input rectangular data is converted into raster image data and also subjected to a clock rate change, and the obtained raster image data is output to the printer 2095.

A memory control unit 2122 which is connected to a memory bus 2108 performs image data writing, image data reading, a refresh operation for the image data (if necessary) and the like to an image memory 1 (2123) according to an request of the image output I/F 2113. In the present embodiment, an example that an SDRAM is used as the image memory is shown.

Figure 12:
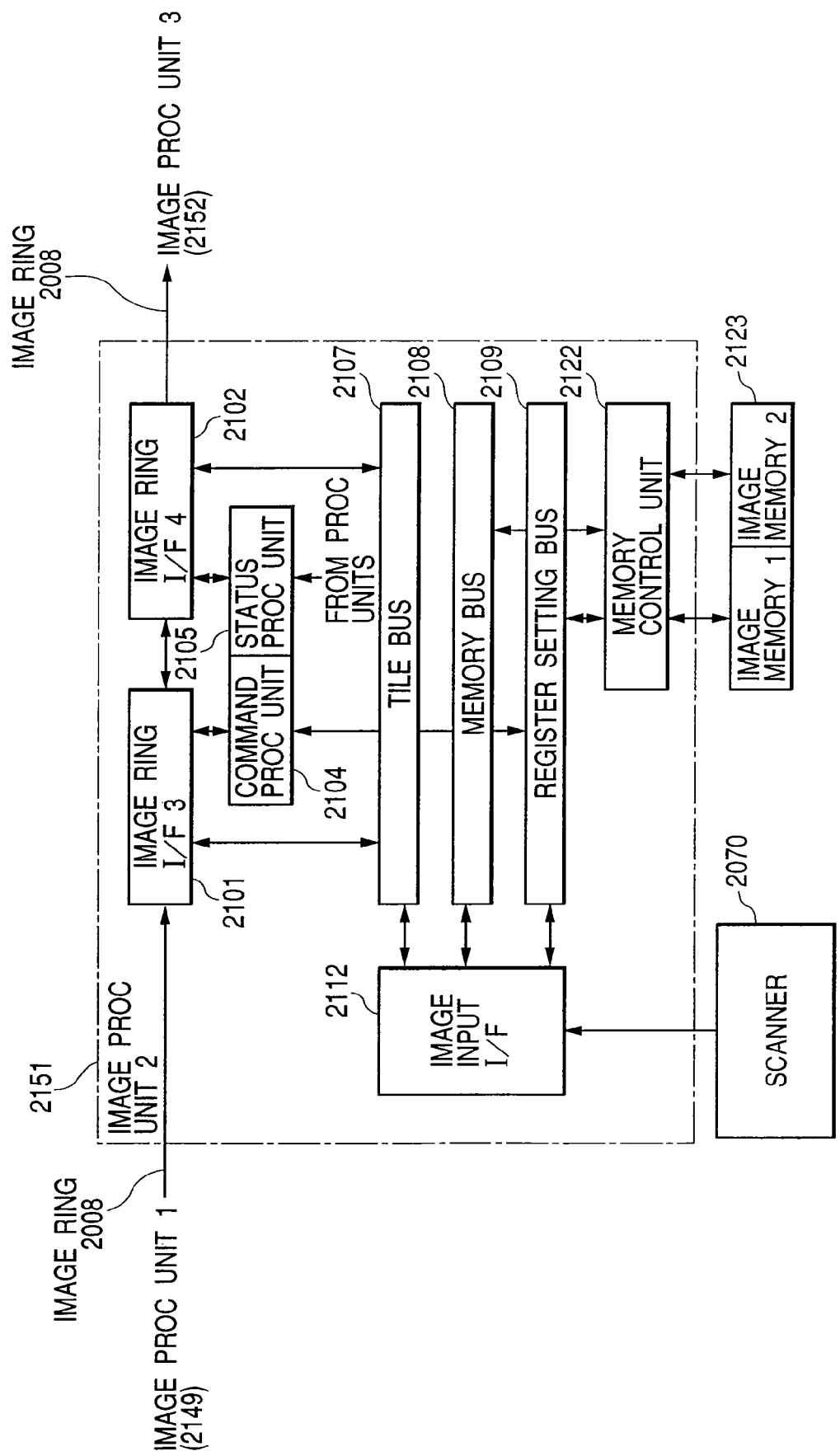
FIG. 12 is a detailed block diagram for entirely explaining the internal structure of an image processing unit 2 in the second embodiment.

Next, FIG. 12 is a detailed block diagram for entirely explaining the internal structure of the image processing unit 2 (2151).

The image ring 2008 functioning as the packet transfer means consists of the combination of the series of unidirectional connection paths. In the image processing unit 2 (2151), the image ring 2008 is connected to a command processing unit 2104, a status processing unit 2105 and a tile bus 2107 through an image ring I/F 3 (2101) and an image ring I/F 4 (2102). Such the structure is the same as that of the image processing unit 1 (2149).

In addition to the above blocks (units), an image input I/F 2112 is connected to the tile bus 2107.

Raster data from a scanner 2070 is input to the image input I/F 2112 in the image processing unit 2 (2151), the input raster data is converted into rectangular image data and also subjected to a clock rate change, and the obtained rectangular image data is output to the tile bus 2107.

A memory control unit 2122 which is connected to a memory bus 2108 performs image data writing, image data reading, a refresh operation for the image data (if necessary) and the like to an image memory 1 (2123) according to an request of the image input I/F 2112. In the present embodiment, an example that an SDRAM is used as the image memory is shown.

Figure 13:
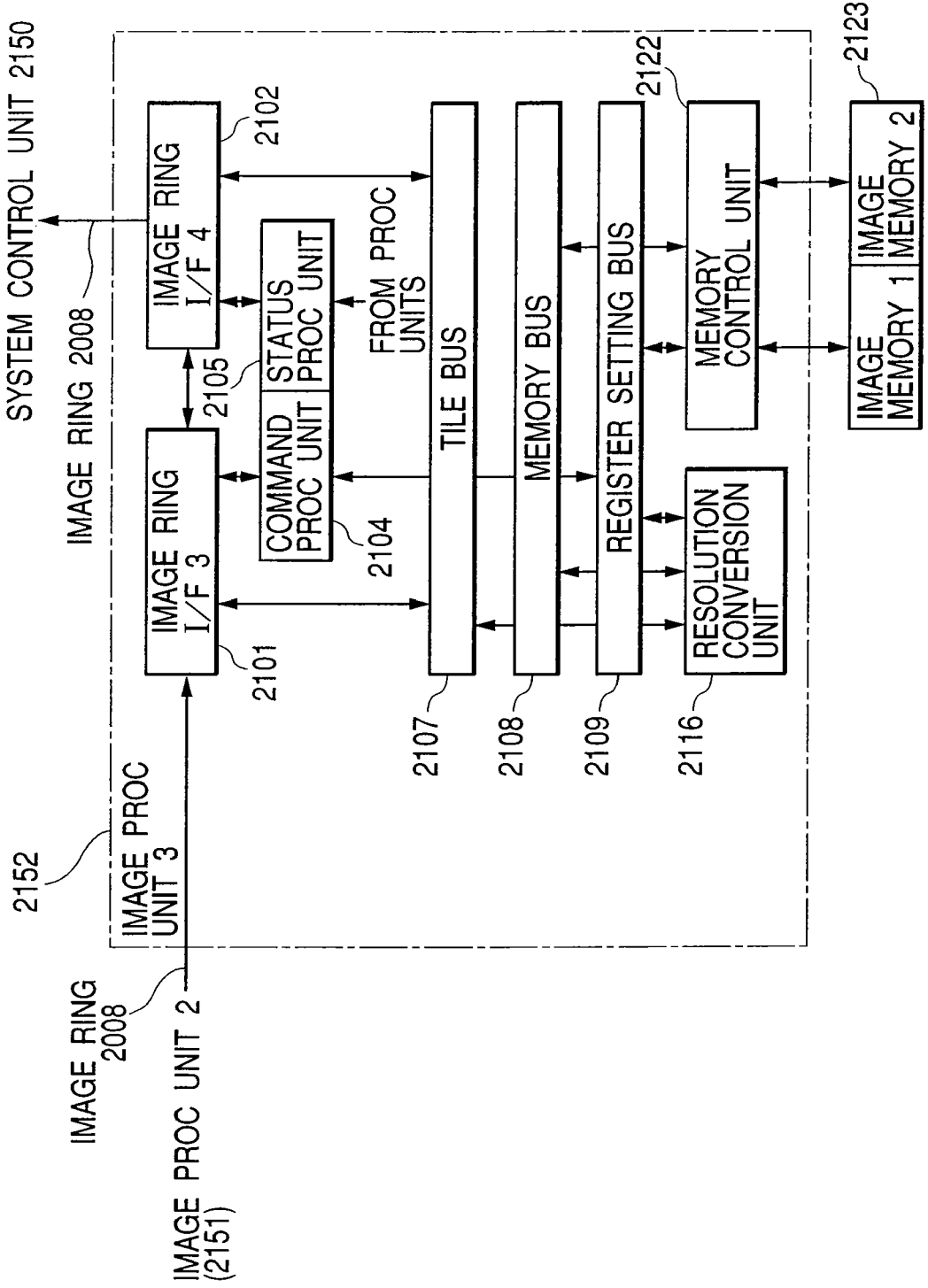
FIG. 13 is a detailed block diagram for entirely explaining the internal structure of an image processing unit 3 in the second embodiment.

Next, FIG. 13 is a detailed block diagram for entirely explaining the internal structure of the image processing unit 3 (2152).

The image ring 2008 functioning as the packet transfer means consists of the combination of the series of unidirectional connection paths. In the image processing unit 3 (2152), the image ring 2008 is connected to a command processing unit 2104, a status processing unit 2105 and a tile bus 2107 through an image ring I/F 3 (2101) and an image ring I/F 4 (2102). Such the structure is the same as that of the image processing unit 1 (2149) or the image processing unit 2 (2151).

In addition to the above blocks (units), a resolution conversion unit 2116 is connected to the tile bus 2107.

Image packet data input from the image ring 2008 is transferred to the resolution conversion unit 2116 through the tile bus 2107, input rectangular data is converted into raster data by using an image memory 2123 through a memory bus 2108. After then, resolution conversion is performed to the raster data, the generated image data is again converted into the rectangular data by using the image memory 2123 and the memory bus 2108, and then the obtained rectangular data is output to the image ring I/F 4 (2102) through the tile bus 2107. Thus, the image ring I/F 4 (2102) transfers the rectangular data as the image packet data to the image ring 2008.

Figure 14:
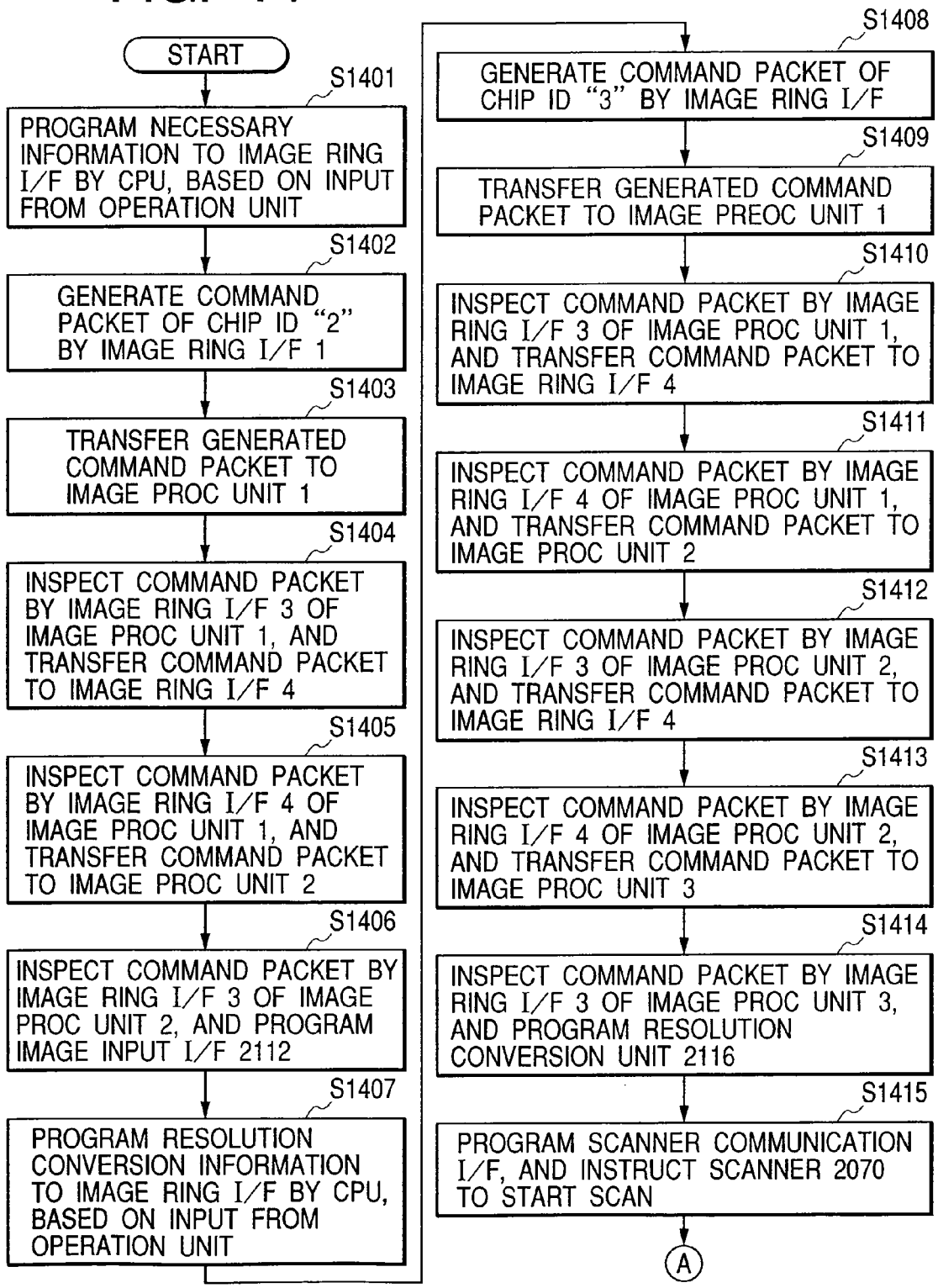
FIG. 14 is a flow chart for explaining a scanning operation in case of instructing the digital multifunctional machine in the second embodiment to perform a copying job.
Figure 15:
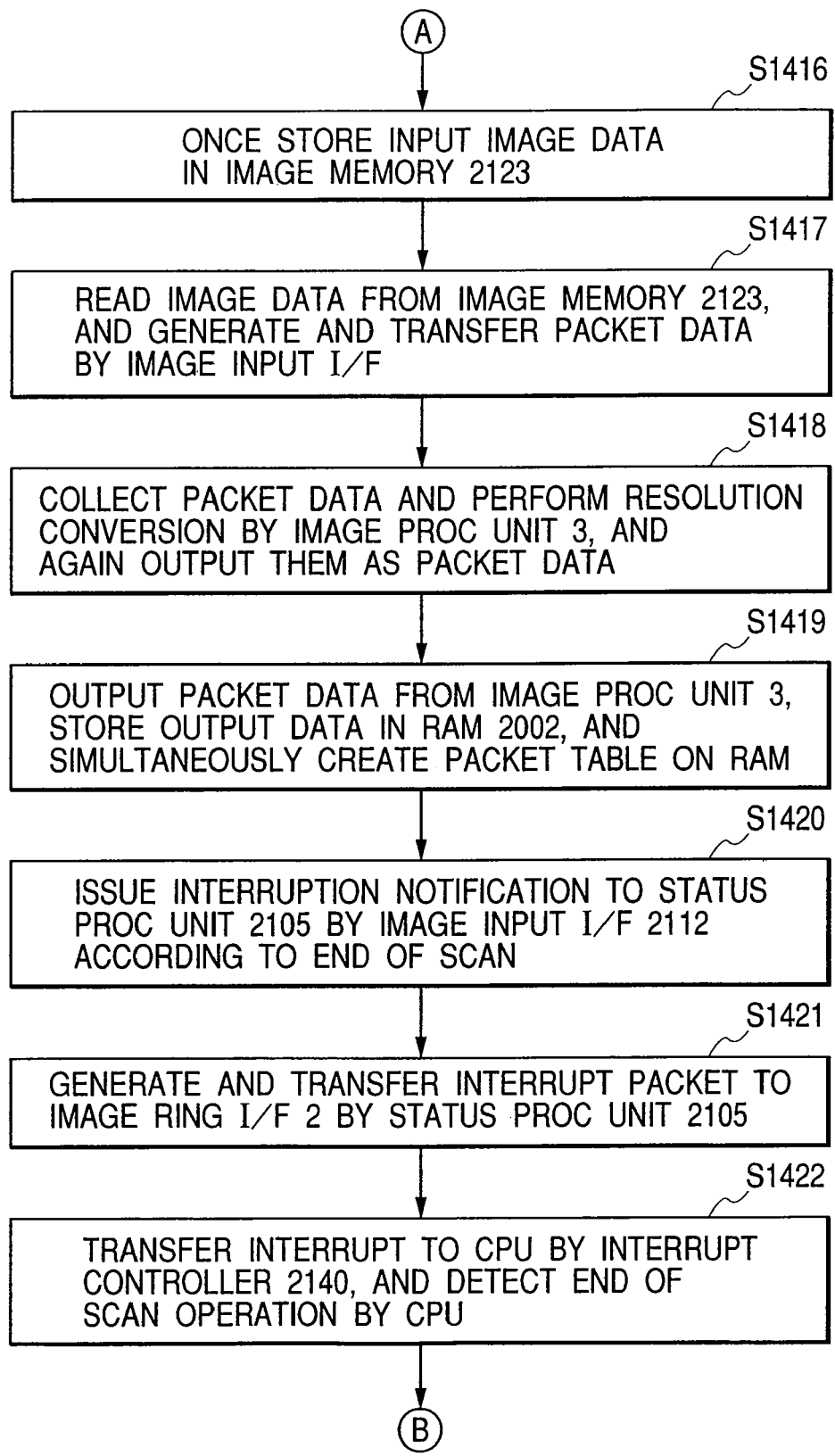
FIG. 15 is a flow chart for explaining the scanning operation in case of instructing the digital multifunctional machine in the second embodiment to perform the copying job.
Figure 16:
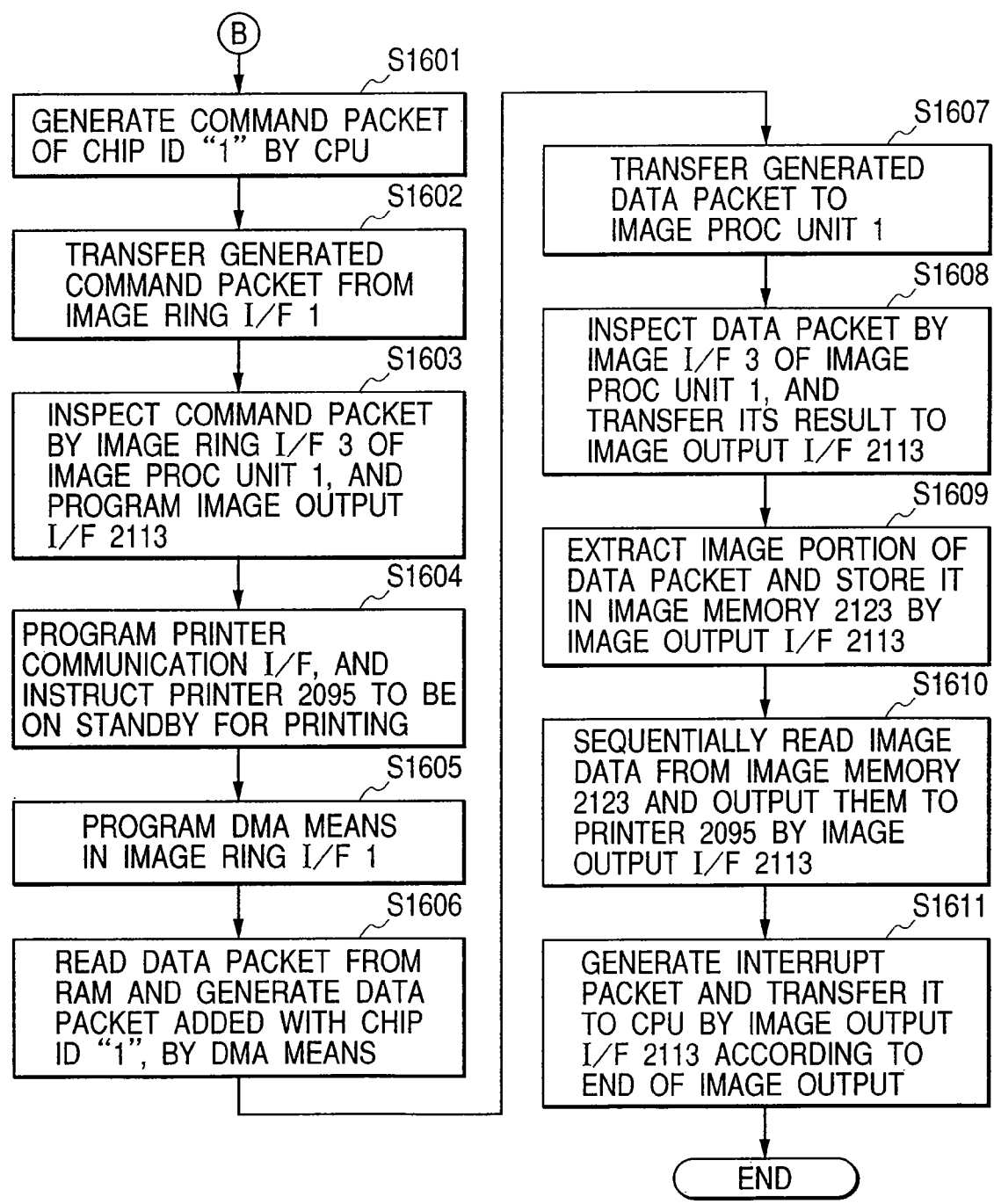
FIG. 16 is a flow chart for explaining a printing operation in case of instructing the digital multifunctional machine in the second embodiment to perform the copying job.

Hereinafter, as a typical process which is performed by the controller unit 2000, a process in a case where a user instructs a magnification-change copying job from the operation unit 2012 will be explained with reference to the flow charts shown in FIGS. 14, 15 and 16.

First, the process that the copying job is received by the controller unit 2000, a scanning operation by using the scanner 2070 starts, the resolution of the scanned image is converted, and finally the resolution-converted scanned image is stored in the RAM 2002 will be explained with reference to FIGS. 13 and 14.

The CPU 2001 receives the information from the operation unit I/F 2006, and programs the necessary information such as the number of the transferred packets, the image storage address on the RAM 2002 and the like to the image ring I/F 2 (2148) on the basis of the information such as a sheet size and the like (step S1401).

Then, the CPU 2001 programs the command packet generation register in the image ring I/F 1 (2147) through the register access ring 2137, and generates a command packet to set the necessary information such as the sheet size, color space information and the like to the image input I/F 2112. In this case, the CPU 2001 sets the chip ID 4004 of the command packet to "2" representing the image processing unit 2 (2151) (step S1402).

After then, the image ring I/F 1 (2147) transfers the command packet to the image processing unit 1 (2149) through the image ring 2008 (step S1403).

The image ring I/F 3 (2101) of the image processing unit 1 (2149) inspects the chip ID of the command packet. Since the chip ID is not "1" representing own chip's ID, the command packet is transferred to the image ring I/F 4 (2102) (step S 1404).

Since the chip ID is different also in the image ring I/F 4 (2102), the image ring I/F 4 (2102) again transfers the command packet to the image processing unit 2 (2151) through the image ring 2008 (step S1405).

The chip ID of the command packet reached the image processing unit 2 (2151) is inspected by the image ring I/F 3 (2101) in the image processing unit 2 (2151). Here, the chip ID of the command packet and the own chip's ID are coincident by "2". In this case, the command processing unit 2104 programs the image input I/F 2112 through the register setting bus 2109, on the basis of the command data and the header information of the command packet (step S 1406).

Subsequently, the CPU 2001 receives the information from the operation unit I/F 2006, calculate resolution of a magnification change, and programs resolution conversion information such as conversion resolution and the like to the image ring I/F 2 (2148) (step S1407).

Then, the CPU 2001 programs the command packet generation register in the image ring I/F 1 (2147) through the register access ring 2137, and generates the command packet to set the conversion resolution in the resolution conversion unit 2116 of the image processing unit 3 (2152). In this case, the CPU 2001 sets the chip ID 4004 of the command packet to "3" representing the image processing unit 3 (2152) (step S1408).

After then, the image ring I/F 1 (2147) transfers the command packet to the image processing unit 1 (2149) through the image ring 2008 (step S1409).

The image ring I/F 3 (2101) of the image processing unit 1 (2149) inspects the chip ID of the command packet. Since the chip ID is not "1" representing own chip's ID, the command packet is transferred to the image ring I/F 4 (2102) (step S1410).

Since the chip ID is different also in the image ring I/F 4 (2102) of the image processing unit 1 (2149), the image ring I/F 4 (2102) again transfers the command packet to the image processing unit 2 (2151) through the image ring 2008 (step S1411).

The image ring I/F 3 (2101) of the image processing unit 2 (2151) inspects the chip ID of the command packet. Since the chip ID is not "2" representing own chip's ID, the command packet is transferred to the image ring I/F 4 (2102) (step S1412).

Since the chip ID is different also in the image ring I/F 4 (2102) of the image processing unit 2 (2151), the image ring I/F 4 (2102) again transfers the command packet to the image processing unit 3 (2152) through the image ring 2008 (step S1413).

The chip ID of the command packet reached the image processing unit 3 (2152) is inspected by the image ring I/F 3 (2101) in the image processing unit 3 (2152). Here, the chip ID of the command packet and the own chip's ID are coincident by "3". In this case, the command processing unit 2104 programs the resolution conversion unit 2116 through the register setting bus 2109, on the basis of the command data and the header information of the command packet (step S1414).

Then, similarly, the CPU 2001 programs a scanner communication interface in the image input I/F 2112 by using the command packet, and instructs the scanner 2070 to start the scanning operation (step S 1415).

The image information input by the scanner 2070 is once stored in the image memory 2123 controlled by the memory control unit 2122, through the image input I/F 2112 and the memory bus 2108 (step S 1416).

The stored image data is again read for each 32×32 pixels by the image input I/F 2112. Then, the header information such as the packet type (Pckt Type) 3004, the chip ID (Chip ID) 3005, the data type (Data Type) 3006, the page ID (Page ID) 3007, the job ID (Job ID) 3008, the tile coordinate (Packet ID Y-coordinate) 3009 in the Y direction, the tile coordinate (Packet ID X-coordinate) 3010 in the X direction, the compression flag (Compress Flag) 3017, the process instruction (Process Instruction) 3011, the packet length (Packet Byte Length) 3012 and the like is added to the image data to generate the data packet, and the generated data packet is output to the tile bus 2107 (step S1417). At this time, the chip ID is set to "3", and the value representing the resolution conversion is set to the process instruction 3011.

The data packets are sequentially generated. Like the command packet, the generated data packet is transferred to the image ring I/F 3 (2101) of the image processing unit 3 (2152) through the image ring I/F 4 (2102) and the image ring 2008 on the basis of the chip ID.

In the image ring I/F 3 (2101) of the image processing unit 3 (2152), the header of the packet is inspected. Since the chip ID is "3" and the process instruction 3011 indicates the resolution conversion, the data packet is transferred to the resolution conversion unit 2116 in the image processing unit 3 (2152). In the resolution conversion unit 2116, as described above, the input data packets are sequentially stored in the image memory and then converted into the raster image data. After then, the resolution of the data is converted by a known method, the generated image of new resolution is cut rectangularly, and then the obtained data is transferred as the data packet to the image ring (step S1418).

Then, the data packets are sequentially stored in the RAM 2002 on the basis of the information programmed to the image ring I/F 2 (2148). At the same time, the image ring I/F 2 (2148) creates the packet table 6001 on the RAM 2002 (step S1419).

If the scanning operation of one page ends, such an end is transferred to the image input I/F 2112 by using a scanner communication means. The image input I/F 2112 in the image processing unit 2 (2151) notifies the status processing unit 2105 in the image processing unit 2 (2151) of an interrupt by using an interrupt signal (not shown) (step S1420).

The status processing unit 2105 in the image processing unit 2 (2151) generates the interrupt packet and then transfers the generated interrupt packet to the image ring I/F 2 (2148) (step S1421).

The image ring I/F 2 (2148) interprets the interrupt packet and then transfers the interrupt to the interrupt controller 2140 by using an interrupt signal (not shown). The interrupt is transferred to the CPU 2001 by the interrupt controller 2140, whereby the CPU 2001 detects the end of the scanning operation (step S1422).

If the scanning operation ends, the printing operation using the printer 2095 starts. Thus, the process of the controller unit 2000 in the printing operation will be explained with reference to FIG. 16.

The CPU 2001 generates the command packet of the chip ID "1" through the register access ring 2137 (step S1601).

Then, the CPU 2001 transfers the generated command packet from the image ring I/F 1 (2147) to the image processing unit 1 (2149) through the image ring 2008 (step S1602).

The image ring I/F 3 (2101) of the image processing unit 1 (2149) inspects the input command packet. Here, since the chip ID is "1", the necessary information for the image output process is set to the image output I/F 2113 of the image processing unit 1 (2149) through the command processing unit 2104 and the register setting bus 2109 on the basis of the command data of the command packet (step S1603).

Similarly, by using the command packet, the CPU 2001 instructs the printer 2095 to be on standby for the printing by a printer communication means provided in the image output I/F 2113 of the image processing unit 1 (2149) (step S1604).

Subsequently, the CPU 2001 programs the memory address where the packet table exists and the like to a DMA means provided in the image ring I/F 1 (2147) (step S1605).

The DMA means in the image ring I/F 1 (2147) reads the data packet from the RAM 2002 and generates the data packet in which the chip ID "1" has been added to the header, on the basis of the programmed information (step S1606).

Then, the DMA means in the image ring I/F 1 (2147) transfers the generated data packet to the image processing unit 1 (2149) through the image ring 2008 (step S1607).

The image ring I/F 3 (2101) of the image processing unit 1 (2149) inspects the input data packet. Here, since the chip ID is "1", the data packets are sequentially transferred to the image output I/F 2113 through the image ring I/F 3 (2101) and the tile bus 2107 (step S1608).

The image output I/F 2113 extracts the image portion from the received data packet and stores the image data in the image memory 2123 (step S1609).

When the image data of the necessary pixels is stored in the image memory 2123, the image output I/F 2113 sequentially reads the image data from the image memory 2123 and outputs them to the printer 2095 (step S1610).

Thus, the user can obtain image prints being the copying results. When the image output of the necessary number of pixels ends, like the case of the scanning operation, an end interrupt is transferred to the CPU 2001 by the interrupt packet (step S1611).

As above, in the present embodiment, the connection is established by the image ring 2008 between the system control unit and the image processing unit 1, between the image processing unit 1 and the image processing unit 2, between the image processing unit 2 and the image processing unit 3, and between the image processing unit 3 and the system control unit, and thus the command packet, the data packet and the like are transferred unidirectionally.

Then, in the image processing unit 2, the image data input by the scanner is transferred to the image processing unit 3 on the basis of the setting information generated by the command packet. In the image processing unit 3, the image data received from the image processing unit 2 is subjected to the resolution conversion process on the basis of the setting information generated by the command packet, and the resolution-converted image data is transferred to the system control unit. Then, in the system control unit, the magnification-change scanning operation is performed to store the image data received from the image processing unit 3 in the RAM.

Besides, in the system control unit, after the image data of one page was stored in the RAM, the image data in the RAM is transferred to the image processing unit 1. Thus, the image processing unit 1 performs the printing operation to output the image data received from the system control unit to the printer on the basis of the setting information by the command packet. The magnification-change copying process is achieved by the combination of the above magnification-change scanning operation and the printing operation.

By performing such the data transfer process with use of the image ring functioning as the unidirectional bus, like the first embodiment, the magnification-change copying process can be performed without a decrease in the processing speed due to the competitions for the image processing unit, the bus and the like.

Besides, the system control unit and each image processing unit are composed respectively on the separated (different) semiconductor substrates, and further the image processing unit 3 for the image conversion process is independently provided. Thus, even if only the image conversion function is changed and/or added, it is possible to easily change the structure of the controller.

For example, if the resolution conversion unit of the image processing unit 3 is changed to an image rotation unit, an image composition unit or the like, the structure can be easily changed. Besides, if a further printer is additionally connected, it only has to connect the image processing unit of the same structure as that of the image processing unit 1 between the image processing units 1 and 2, whereby it is possible to provide at low cost the image processing unit according to the specification of the printer.

(Third Embodiment)

Figure 17B:
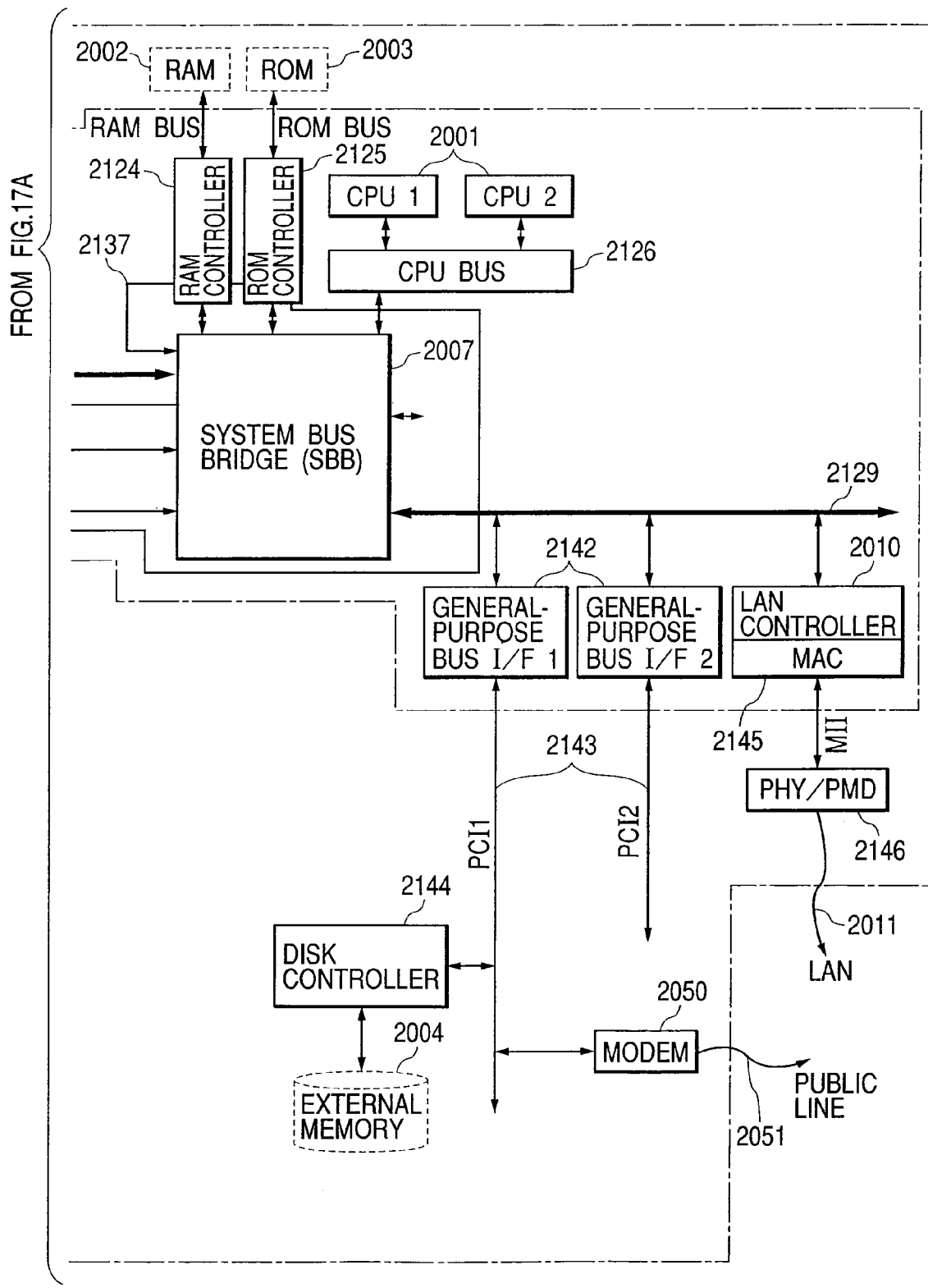
FIG. 17 which is composed of FIGS. 17A and 17B is a detailed block diagram for entirely explaining the internal structures of a system control unit 2150 and an image processing unit 1 (2149) in the third embodiment.

FIG. 17 which is composed of FIGS. 17A and 17B shows a controller unit 2000 according to the present embodiment. In the controller unit 2000 of the present embodiment, an image processing unit is provided only as an image processing unit 1 (2149). Thus, an image ring I/F 4 (2101) of the image processing unit 1 (2149) is connected to an image ring I/F 2 (2148) of a system control unit 2150. Further, both a printer 2095 and a scanner 2070 are connected to the image processing unit 1 (2149).

Besides, in the image processing unit 1 (2149), a tile decompression (expansion) unit 2103 and a tile compression unit 2106 are additionally provided. That is, an image ring 2008 is connected to a command processing unit 2104, a status processing unit 2105, the tile decompression unit 2103 and the tile compression unit 2106 through an image ring I/F 3 (2101) in the image processing unit 2149.

The tile decompression unit 2103 is connected to a tile bus 2107 as well as the image ring I/F 3 (2101). This tile decompression unit 2103 is the bus bridge to decompress compressed image data input from the image ring and then transfer the decompressed image data to the tile bus 2107. The present embodiment shows an example that JPEG (Joint Photographic Experts Group) data is adopted as multivalue data, and a packbits system is adopted as a decompression algorithm for binary data.

The tile compression unit 2106 is connected to the tile bus 2107 as well as the image ring I/F 4 (2102). This tile compression unit 2106 is the bus bridge to compress image data before compression and then transfer the compressed image data to the image ring 2008. The present embodiment shows an example that JPEG data is adopted as multivalue data, and a packbits system is adopted as a compression algorithm for binary data.

Thus, since the image processing unit 1 (2149) has a function to compress and decompress the data packet, a data capacity of a RAM 2002 necessary to store image data can be decreased.

When the compressed data packet is transferred from the image processing unit 1 (2149) to the system control unit 2150, information representing an image data length after the compression is described in the header in the tile compression unit 2106, and the image ring I/F 4 (2102) transfers the data packet with the header including the image data length.

However, in a case where the data packet is transferred after it was compressed, since the image data length is not determined if the compression does not end, the image ring I/F 4 (2102) has to transfer the data packet after the compression. That is, a buffer to store and hold the data packet before it is transferred is necessary in the tile compression unit 2106 or the like.

Generally, it is difficult to predict the data capacity after the data was compressed, and there is a possibility that the data capacity after the data compression becomes larger than the original data capacity. If so, since it is necessary to secure the capacity of the buffer to have sufficient room, a remarkably large capacity might become necessary when the maximum capacity of the data packet is large.

In the present embodiment, the controller unit 2000 by which a large-capacity buffer to temporarily store and hold the data packet after it was compressed becomes unnecessary will be explained.

First, FIG. 18 shows tile image data in the present embodiment. It should be noted that the tile image data can be used as the tile image data in the first and second embodiments.

As shown in FIG. 18, an original (original data) 1800 of one page input as the raster image data from the scanner 2070 or the like is divided into plural rectangular areas (i.e., tiles). Each rectangular area has the size of longitudinal 32 pixels and lateral 32 pixels, and tile image data is generated for each area. Here, if it is assumed that an A-4 sized original is read by the scanner 2070 at resolution of 600 dpi×600 dpi and then divided into tile images of 32×32 pixels, then 34320 tile images (image data) are generated from the A-4 sized original.

When the tile images are generated, the tile images can be made to have manageable shapes and number of pixels by performing appropriate setting according to conditions of reading resolution and image processes.

The unit of the tile is not limited to 32×32 pixels, for example, 64×64 pixels may be used. Besides, the shape of the tile is not limited to the square, for example, a rectangle may be used. When the image data is compressed, the data of one page are not collectively compressed, but only the image data are compressed for each tile (packet).

Figure 19:
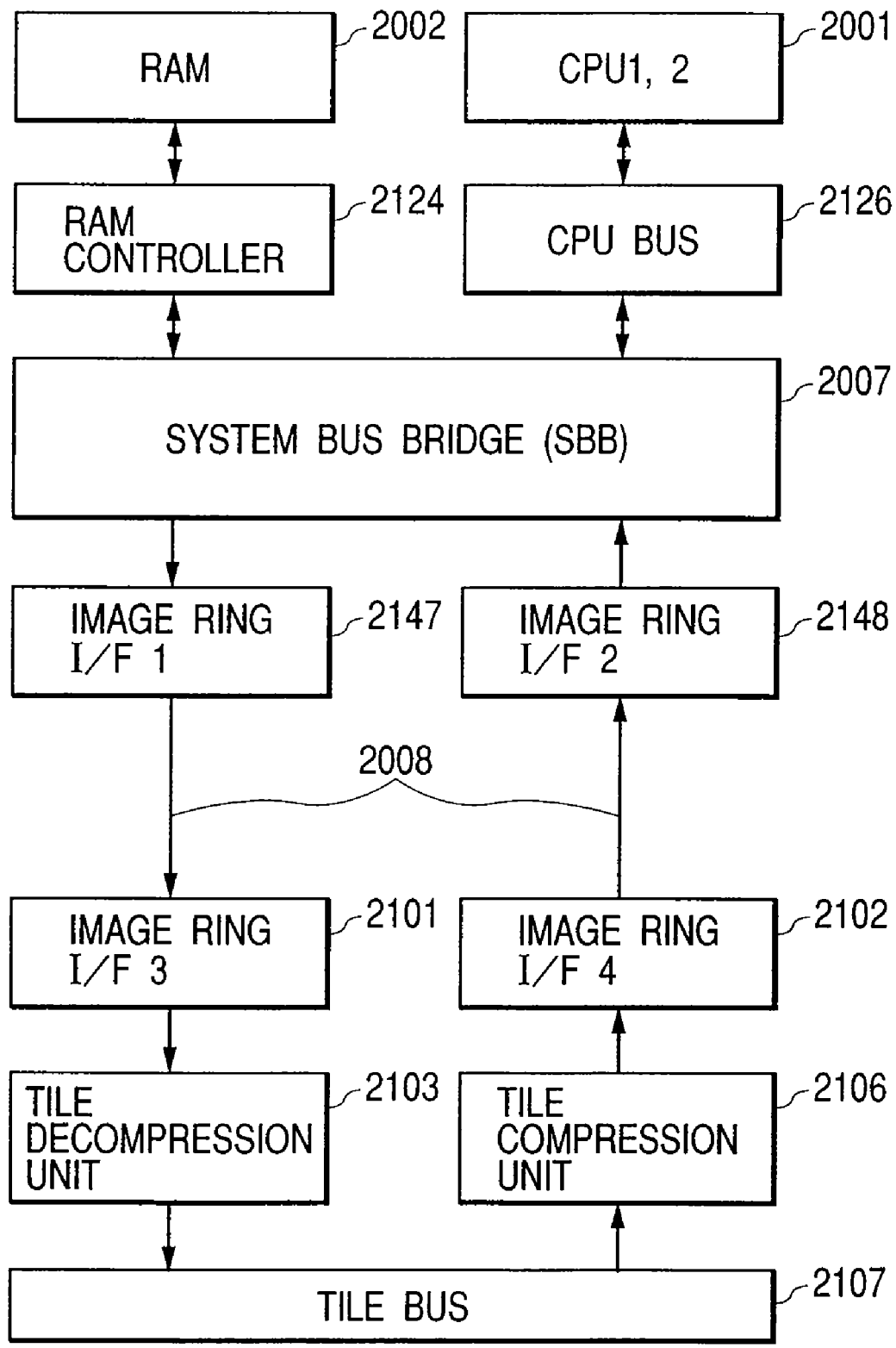
FIG. 19 is a block diagram showing a block concerning the process according to the present invention, extracted from the system shown in FIG. 17.

FIG. 19 is a block diagram showing the block concerning the process according to the present invention, extracted from the system shown in FIG. 17. The flow of the image data in the present embodiment will be explained with reference to FIG. 19.

If the non-compressed data packet is input from the tile bus 2107, the image data of the packet is compressed by the tile compression unit 2106, and the compressed data packet is transferred to the image ring I/F 4 (2102). The chip ID 3005 of the packet is set to "0" by the image ring I/F 4 (2102), and the data packet is then output to the image ring 2008.

The chip ID 3005 of the data packet input from the image ring 2008 is inspected by the image ring I/F 2 (2148). Here, since the chip ID is "0", the data packet is stored in the RAM 2002 by the image ring I/F 2 (2148) through an SBB (system bus bridge) 2007 and a RAM controller 2124.

When the data packet stored in the RAM 2002 is output, the packet is read from the RAM 2002 by an image ring I/F 1 (2147) through the SBB 2007. The chip ID 3005 of the read data packet is set to "1" by the image ring I/F 1 (2147), and then the data packet is output to the image ring 2008.

The chip ID 3005 of the data packet input from the image ring 2008 is inspected by the image ring I/F 3 (2101). Here, since the chip ID is "1", the data packet is transferred to the tile decompression unit 2103 by the image ring I/F 2 (2148). The image data of the compressed data packet is decompressed by the tile decompression unit 2103, and the decompressed data packet is transferred to the tile bus 2107.

In the process explained above, the tile image data of the data packet is compressed by the tile compression unit 2106, and the compressed data packet is transferred to the image ring I/F 2 (2148) by the image ring I/F 4 (2102) through the image ring 2008. Next, this operation will be explained in detail.

Figure 4:
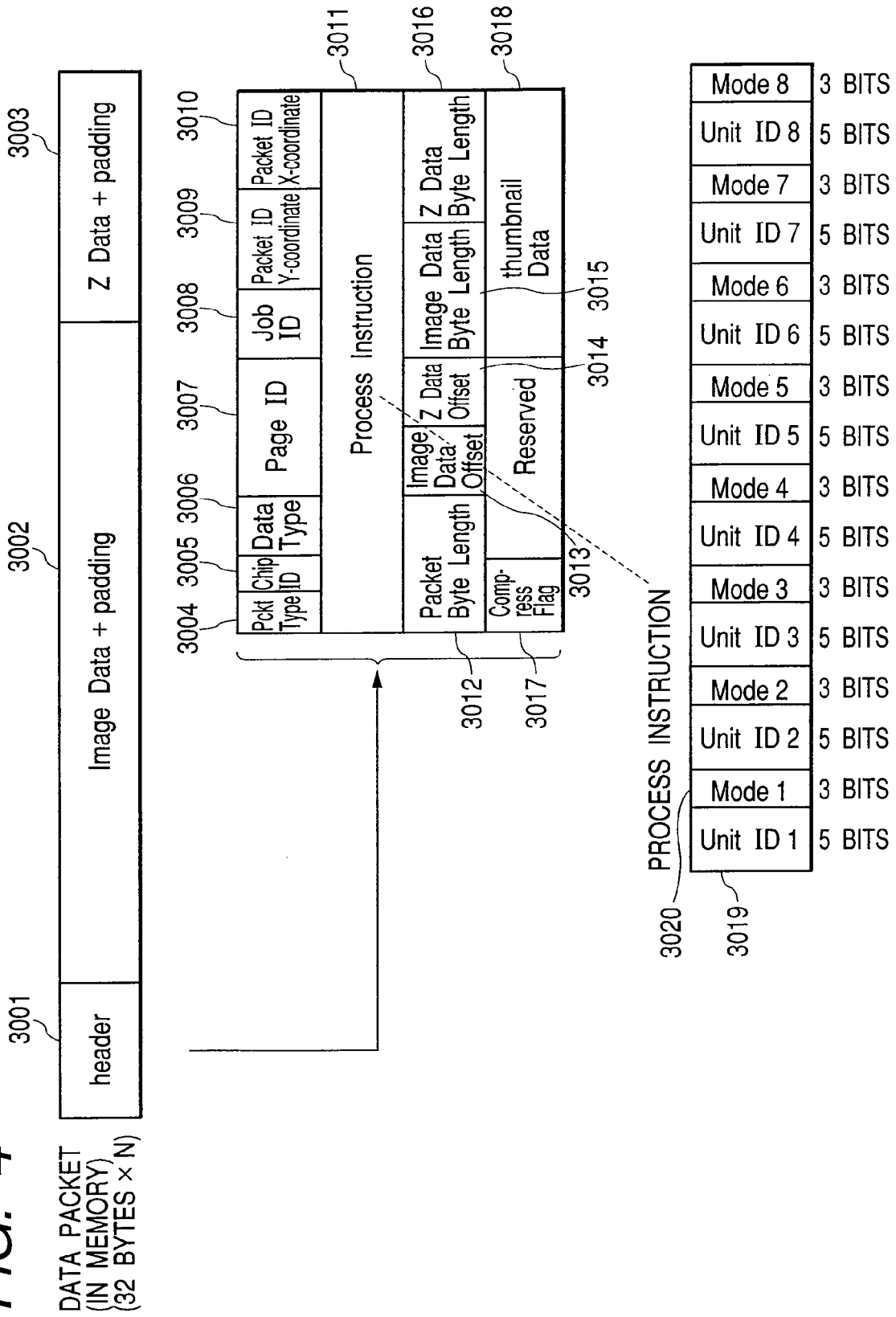
FIG. 4 is a diagram for explaining a data packet used in a controller unit 2000.

Here, to clarify the explanation of the present invention, it is assumed that the format of the data packet in the present embodiment is that obtained by eliminating the image additional information (Z Data+padding) 3003 from the data packet of FIG. 4.

Figure 20:
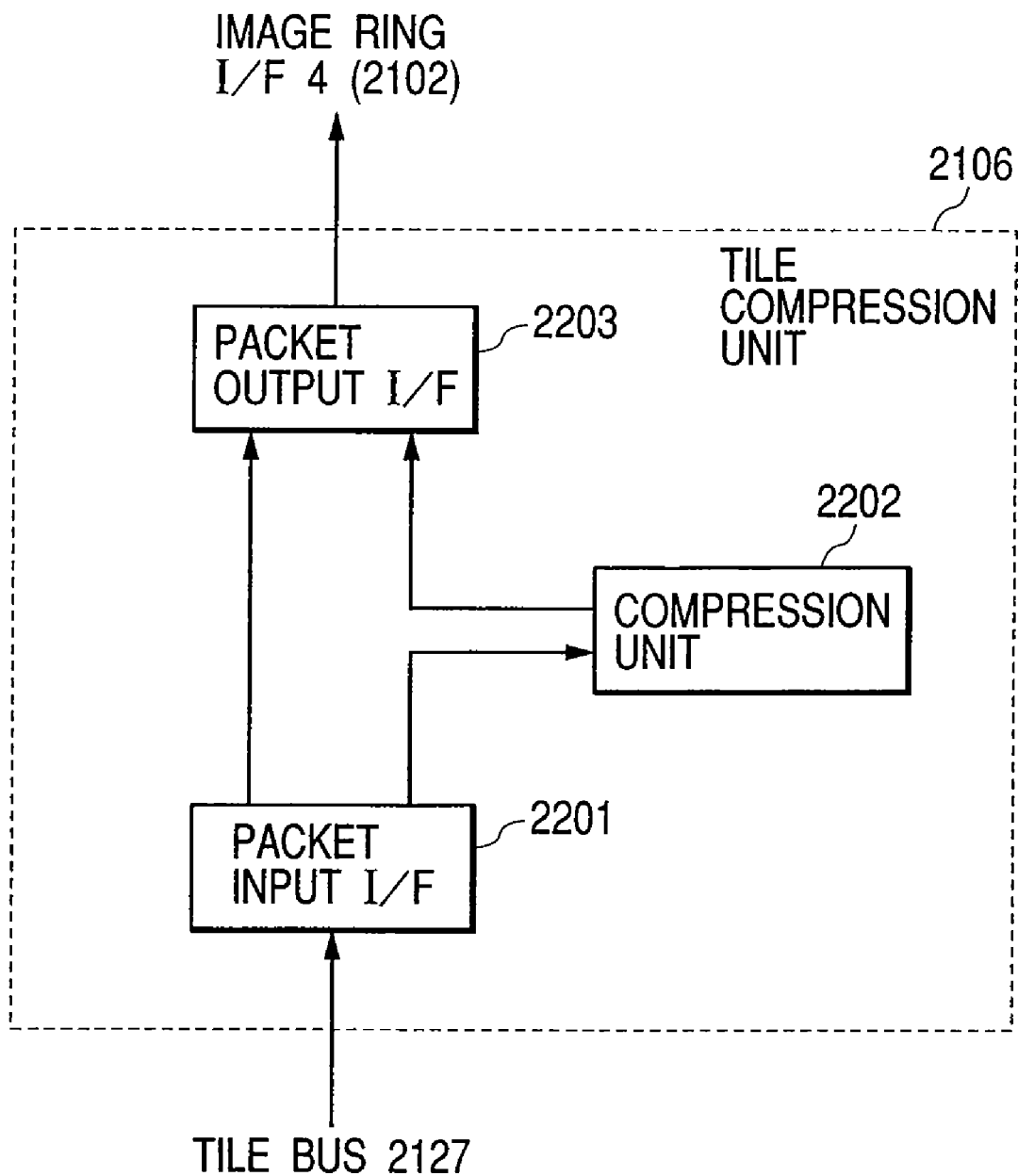
FIG. 20 is a block diagram showing the inside of a tile compression unit.

FIG. 20 is a block diagram showing the inside of the tile compression unit 2106. A packet input I/F 2201 receives the input data packet and divides the received data packet into the header 3001 and the image data 3002. Then, the packet input I/F 2201 transfers the header 3001 to a packet output I/F 2203 and transfers the image data 3002 to a compression unit 2202.

The input image data 3002 is compressed by the compression unit 2202, and the compressed data are sequentially transferred to the packet output I/F 2203.

The header 3001 from the packet input I/F 2201 and the image data 3002 from the compression unit 2202 are again composited by the packet output I/F 2203, and the data packet consisting of the header 30001 and the image data 3002 composited is then transferred to the image ring I/F 4 (2102).

Figure 21:
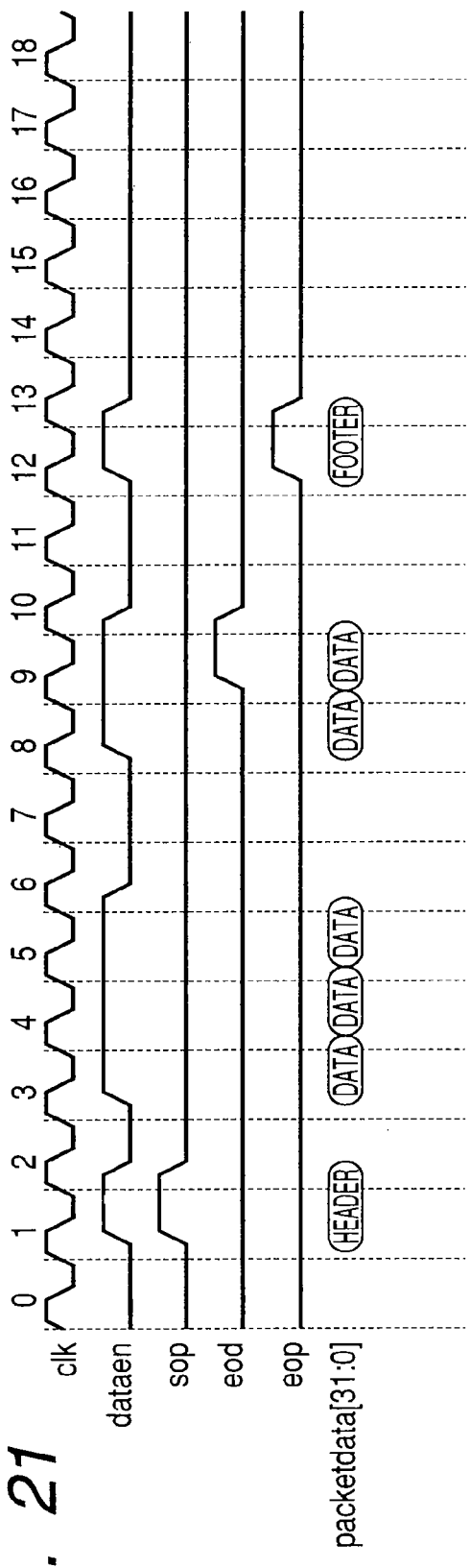
FIG. 21 is a diagram showing signal waveforms in case of transferring a data packet.

FIG. 21 is a diagram showing signal waveforms in case of transferring the data packet from the image ring I/F 4 (2102) to the image ring I/F 2 (2148).

Symbol packetdata[31:0] denotes a signal by which the data of the packet is transferred in the image ring 2008, that is, both the header 3001 and the image data 3002 are transferred by using the signal packetdata[31:0].

Signals clk, dataen, sop, eod, eop are the signals generated by the image ring I/F 4 (2102).

The signal dataen is asserted at a cycle of transferring the packet, and the packet is transferred at the asserted cycle.

The signal sop indicates the start of data packet transferring. The signal packetdata[31:0] of the cycle at which the sop signal is asserted includes the header 3001.

First, the header 3001 is transferred by the image ring I/F 4 (2102). At this time, since the packet length (Packet Byte Length) 3012 and the image data length (Image Data Byte Length) 3015 included in the header 3001 are not determined if the compression does not end completely, these data may be in a undetermined state. For example, such the data may be returned as "0" length data. It should be noted that the header information is later rewritten by a footer.

Next, the compressed image data 3002 is transferred from the tile compression unit 2106 to the image ring I/F 4 (2102), and the image data 3002 are sequentially transmitted as soon as transmission preparation ends. In FIG. 21, an example that the one image data 3002 is divided into the five data blocks and then transmitted is shown.

When the last image data 3002 is transmitted, the signal eod is asserted and transmitted, whereby the last of the image data 3002 is notified to the image ring I/F 2 (2148). Then, the signal eop is asserted by the image ring I/F 4 (2102), the header 3001 including the packet length (Packet Byte Length) 3012 and the image data length (Image Data Byte Length) 3015 determined is transmitted as the footer.

The data packet received through the image ring 2008 is stored at the preset address of the RAM 2002 by the image ring I/F 2 (2148). At this time, the address where the header 3001 is stored is stored in an internal register or the like. At this moment, the undetermined values have been written in the packet length (Packet Byte Length) 3012 and the image data length (Image Data Byte Length) 3015 of the header 3001.

If the footer is received at the end of the data packet, the content of the footer is overwritten for the address where the header 3001 has been stored. By doing so, the packet in which the packet length (Packet Byte Length) 3012 and the image data length (Image Data Byte Length) 3015 according to the packet format shown in FIG. 4 have been determined is generated on the RAM 2002.

Next, a case where the data packet is stored in the RAM 2002 without compressing the image data 3002 is considered.

The tile compression unit 2106 has two kinds of modes (i.e., a compression mode and a non-compression mode), and one of the two modes is previously set by the CPU 2001 or the like.

If the compression mode is set, as described above, the information representing the footer transmission is transferred from the image ring I/F 4 (2102) to the system control unit 2150 being the reception side. After the data packet was transmitted, the footer including the information to update the header information transferred to the system control unit 2150 is transferred.

If the compression is not performed, the data packet received by the packet input I/F 2201 is not transferred to the compression unit 2202 but is directly transferred to the packet output I/F 2203. Then, the data packet is transferred from the packet output I/F 2203 to the image ring I/F 4 (2102).

The header 3001 and the image data 3002 of the data packet are transferred to the image ring I/F 2 (2148) by the image ring I/F 4 (2102) through the image ring 2008. At this time, since the compression is not performed, the packet length (Packet Byte Length) 3012 and the image data length (Image Data Byte Length) 3015 do not change as the former.

The packet length (Packet Byte Length) 3012 and the image data length (Image Data Byte Length) 3015 of the header 3001 have been determined at that time and thus can be transferred to the image ring I/F 2 (2148).

Figure 22:
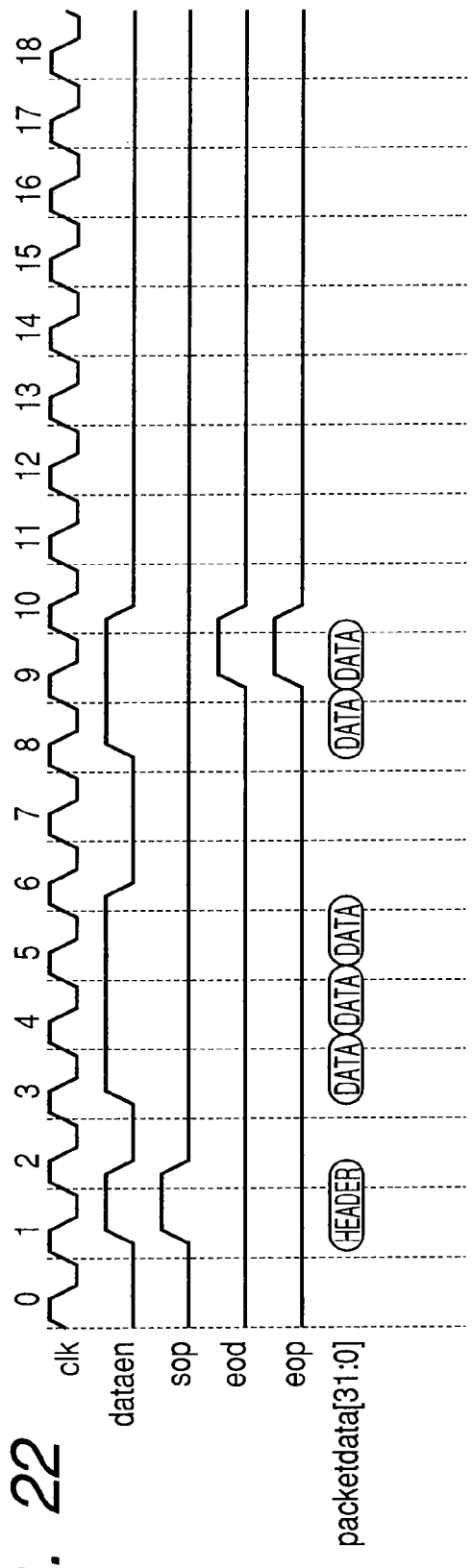
FIG. 22 is a diagram showing signal waveforms in case of transferring the data packet without performing any compression.

FIG. 22 is a diagram showing signal waveforms when the data packet is transferred from the image ring I/F 4 (2102) to the image ring I/F 2 (2148) in this case. It should be noted that, until the last image data 3002 is transferred, the transferring of the header 3001 and the transferring of the image data 3002 are the same as those in the case where the compression is performed.

If the compression is not performed, when the last image data 3002 is transferred, both the signals sod and sop are asserted, and a footer is not transmitted. Since both the signals sod and sop are asserted, the image ring I/F 2 (2148) knows that the footer is not transmitted, whereby the header 3001 is not updated. Even in such a case, the data packet according to the packet format shown in FIG. 4 is resultingly generated on the RAM 2002.

In addition to the lengths, there are other several parameters which are not determined if the compression does not end. For example, a DC component representing the average value of the image data 3002 is convenient, if it is used when thumbnails are created. Further, if there are plural image data, offsets or the like are included in such the parameters. In any case, even if these parameters are included in the packet header, they can be managed in the same manner as in the present invention. In case of the present embodiment, in the packet format of FIG. 4, the data packet may be transmitted by setting the parameter of the DC component to the thumbnail data (thumbnail Data) 3018 and setting the information of the offset to the image data offset (Image Data Offset) 3013.

As explained above, in the present embodiment, the image ring I/F 4 transmits the data packet to the image ring I/F 2 and then transmits the footer including the same information as that of the header of the data packet transmitted, and the image ring I/F 2 updates the information of the header on the basis of the received footer.

Therefore, even if the information not yet determined until the compression of the packet image data ends exists in the information included in the header, it is possible to first send the header and then sequentially send the packet image data. Thus, it is unnecessary to wait for the header transmission until the compression of the packet image data ends, whereby the large-capacity buffer to temporarily store the packet image data after the compression was performed can be made unnecessary.

Further, it is unnecessary to wait for the header transmission until encoding of the data packet ends, and the compression process in the tile compression unit and the storage control to the RAM by the image ring I/F 2 can be performed in parallel, whereby it is possible to achieve efficiency improvement and speed-up of processes in the entire controller.

(Other Embodiments)

In the above embodiments, the case where the present invention is applied to the digital multifunctional machine was explained. However, the apparatus to which the present invention is applicable is not limited to the digital multifunctional machine. For example, the controller unit 2000 may be structured as an external controller of the digital multifunctional machine.

The controller unit having the two image processing units was explained in the first embodiment, the controller unit having the three image processing units was explained in the second embodiment, and the controller unit having the single image processing unit was explained in the third embodiment. However, the number of the image processing units is not limited, whereby it is needless to say that the present invention is applicable to a case where three or more image processing units are provided.

Further, although the present invention was explained with use of the copying process by way of example in the first and second embodiments, the process to which the present invention is applicable is not limited to the copying process. For example, the present invention is applicable to other image input processes such as electronic filing to store image data read by a scanner in an external memory, and the like, and to other image output processes such as facsimile outputting to printer-output facsimile data input through the public line, and the like. At this time, an image input process can be achieved similarly by the process shown in FIG. 8 or FIGS. 14 and 15, and an image output process can be also achieved similarly by the process shown in FIG. 9 or 16.

In the third embodiment, the footer transmission according to the present invention was described with respect to the controller unit shown in FIG. 17. However, the present invention is not limited to this. For example, it is possible to respectively provide a digital multifunctional machine on the transmission side having the function of the image processing unit 1 and a digital multifunctional machine on the reception side having the function of the system control unit, and transfer data packets between these machines through a network or the like.

As above, although the present invention was explained on the basis of the preferred embodiments, the present invention is not limited to these embodiments. That is, various changes and modifications for the present invention are possible within the spirit and scope shown in the appended claims.

What is claimed is:

1. An image processing apparatus comprising:
    a plurality of image processing units adapted to execute an image process, each of the plurality of image processing units including a same plurality of kinds of data processing circuits;
    a division image data generation unit adapted to generate a plurality of tiles of image data by dividing the input image data;
    a packet data generation unit adapted to generate a plurality of packets by adding, to each of the plurality of tiles of image data, first information identifying one of the plurality of image processing units and second information identifying one of the plurality of kinds of data processing circuits;
    a specifying unit adapted to specify, for each of the plurality of packets, an image processing unit and a kind of data processing circuit, based on the first information and the second information; and
    a controlling unit adapted to control such that, for each of the plurality of packets, a data processing circuit of the kind specified by the specifying unit that is included in the image processing unit specified by the specifying unit executes the image process on the tile of image data included in the packet.

2. The image processing apparatus according to claim 1, wherein the division image data generation unit generates the tiles of image data by dividing the image data input in units of pages, into rectangular areas of a predetermined size.

3. The image processing apparatus according to claim 1, further comprising a storage unit adapted to store the tiles of image data,
    wherein the storage unit stores the plurality of tiles of image data at least subjected to the image process by one of the plurality of image processing units.

4. The image processing apparatus according to claim 3, further comprising an image formation unit adapted to form an image on one or more pieces of paper based on the image data input in units of pages,
    wherein one of the plurality of image processing units transfers the image data in units of pages including the plurality of tiles of image data at least subjected to the image process by the one of the plurality of image processing units, to the image formation unit.

5. The image processing apparatus according to claim 1, wherein one of the plurality of image processing units transfers the plurality of tiles of image data subjected to the image process, to another image processing unit.

6. The image processing apparatus according to claim 1, wherein the image process executed by one of said plurality of kinds of data processing circuits is a rotation process of the image data.

7. The image processing apparatus according to claim 1, wherein the image process executed by one of said plurality of kinds of data processing circuits is a resolution conversion process of the image data.

8. The image processing apparatus according to claim 1, wherein
    the packet data generation unit adds a plurality of sets of the first information and the second information to the packets as additional information, and
    the additional information is fixed-length information corresponding to a number of the image processing units.

9. The image processing apparatus according to claim 1, further comprising a compression unit adapted to execute a compression process on the tiles of image data.

10. The image processing apparatus according to claim 1, further comprising a decompression unit adapted to execute a decompression process on the tiles of image data included in the packets.

11. An image processing method performed by an image processing apparatus including a computer processor and a plurality of image processing units adapted to execute an image process on input image data, each of the plurality of image processing units including a same plurality of kinds of data processing circuits, the method comprising:
    generating a plurality of tiles of image data by dividing the input image data;
    generating a plurality of packets by adding, to each of the plurality of tiles of image data subjected to the compression process first information identifying one of the plurality of image processing units and second information identifying one of the plurality of kinds of data processing circuits;
    specifying, for each of the plurality of packets, an image processing unit and a kind of data processing circuit, based on the first information and the second information; and
    controlling such that, for each of the plurality of packets, a data processing circuit of the specified kind that is included in the specified image processing unit executes the image process on the tile of image data included in the packet, wherein the image process is performed, at least in part, by the processor.

* * * * *